(12) United States Patent
Kwon et al.

(10) Patent No.: US 8,422,427 B2
(45) Date of Patent: *Apr. 16, 2013

(54) METHOD FOR TRANSMITTING AND RECEIVING SIGNALS BASED ON SEGMENTED ACCESS SCHEME AND METHOD FOR ALLOCATING SEQUENCE FOR THE SAME

(75) Inventors: Yeong Hyeon Kwon, Anyang-Si (KR); Seung Hee Han, Anyang-Si (KR); Hyun Hwa Park, Anyang-Si (KR); Dong Cheol Kim, Anyang-Si (KR); Hyun Woo Lee, Anyang-Si (KR); Min Seok Noh, Anyang-Si (KR); Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 345 days.

This patent is subject to a terminal disclaimer.

(21) Appl. No.: 12/836,391

(22) Filed: Jul. 14, 2010

(65) Prior Publication Data

US 2010/0278114 A1    Nov. 4, 2010

Related U.S. Application Data

(63) Continuation of application No. 12/440,869, filed as application No. PCT/KR2007/004359 on Sep. 10, 2007, now Pat. No. 7,768, 965.

(60) Provisional application No. 60/863,329, filed on Oct. 27, 2006.

(30) Foreign Application Priority Data

Sep. 11, 2006  (KR) .......................... 10-2006-0087290
Sep. 27, 2006  (KR) .......................... 10-2006-0094103

(51) Int. Cl.
*H04W 4/00*  (2009.01)

(52) U.S. Cl.
USPC .......................................... 370/328; 370/330

(58) Field of Classification Search .......... 370/203–211, 370/328–350

See application file for complete search history.

(56) References Cited

U.S. PATENT DOCUMENTS 5,319,374 A    6/1994    Desai et al.
5,642,355 A    6/1997    Smith
(Continued)

FOREIGN PATENT DOCUMENTS

KR    10-1997-0036982 A    9/1997
KR    10-2001-0082697 A    8/2001
(Continued)

OTHER PUBLICATIONS

R1-062275, Comparison of Zadoff-Chu and Zero Correlation Zone Codes for E-UTRA RACH, TSG-RAN WG1 #46, 7 pages, 2006.*

(Continued)

*Primary Examiner* — Frank Duong
(74) *Attorney, Agent, or Firm* — Birch, Stewart, Kolasch & Birch, LLP

(57) ABSTRACT

A segmented access based signal transmitting/receiving method and a sequence allocating method for the same are disclosed. According to one embodiment of the present invention, a method of transmitting a signal of a user equipment in a communication system includes selecting a channel in accordance with at least one selected from the group consisting of a signal attenuation extent of a downlink signal to the user equipment and a speed of the user equipment from channels differently provided based on at least one selected from the group consisting of the signal attenuation extent of the downlink signal and the speed of the user equipment and transmitting the signal using the selected channel.

10 Claims, 17 Drawing Sheets

U.S. PATENT DOCUMENTS

| | | | |
|---|---|---|---|
| 5,914,947 A | 6/1999 | Saito | |
| 7,768,965 B2 * | 8/2010 | Kwon et al. | 370/328 |
| 7,894,396 B2 * | 2/2011 | Noh et al. | 370/329 |
| 2002/0160781 A1 | 10/2002 | Bark et al. | |
| 2004/0157602 A1 | 8/2004 | Khawand | |
| 2004/0162075 A1 | 8/2004 | Malladi et al. | |
| 2004/0214590 A1 | 10/2004 | Al-Housami et al. | |
| 2005/0265222 A1 | 12/2005 | Gerlach | |
| 2007/0123257 A1 | 5/2007 | Noll et al. | |
| 2007/0165567 A1 | 7/2007 | Tan et al. | |
| 2008/0101306 A1 | 5/2008 | Bertrand et al. | |
| 2008/0130588 A1 | 6/2008 | Jeong et al. | |
| 2008/0192678 A1 | 8/2008 | Bertrand et al. | |
| 2010/0034155 A1 | 2/2010 | Noh et al. | |

FOREIGN PATENT DOCUMENTS

| | | |
|---|---|---|
| KR | 10-2005-0053714 A | 6/2005 |
| KR | 10-2006-0047736 A | 5/2006 |
| KR | 10-2006-0060487 A | 6/2006 |
| WO | WO 2005/122628 A1 | 12/2005 |

OTHER PUBLICATIONS

R1-062306, RACH Sequence Extension Methods for Large Cell Deployment, TSG-RAN WG1 Meeting #46, 7 pages, 2006.*

R1-062307, RACH Design for Large Cell Deployment, TSG-RAN WG1 Meeting #46, 6 pages, 2006.*

R1-062387, RACH in Support of High-Speed UEs, TSG-RAN WG1 Meeting #46, 9 pages, 2006.*

"RACH Design for Large Cell Deployment", 3GPP TSG WG1 Meeting #46, R1-062307, Tallinn, Estonia, Aug. 1-Sep. 1, 2006.

"RACH Sequence Extension Methods for Large Cell Deployment", 3GPP TSG RAN 1 LTE WG1 Meeting # 46, R1-062306, Tallinn, Estonia, 7pages, Aug. 28-Sep. 1, 2006.

* cited by examiner

Figure 2
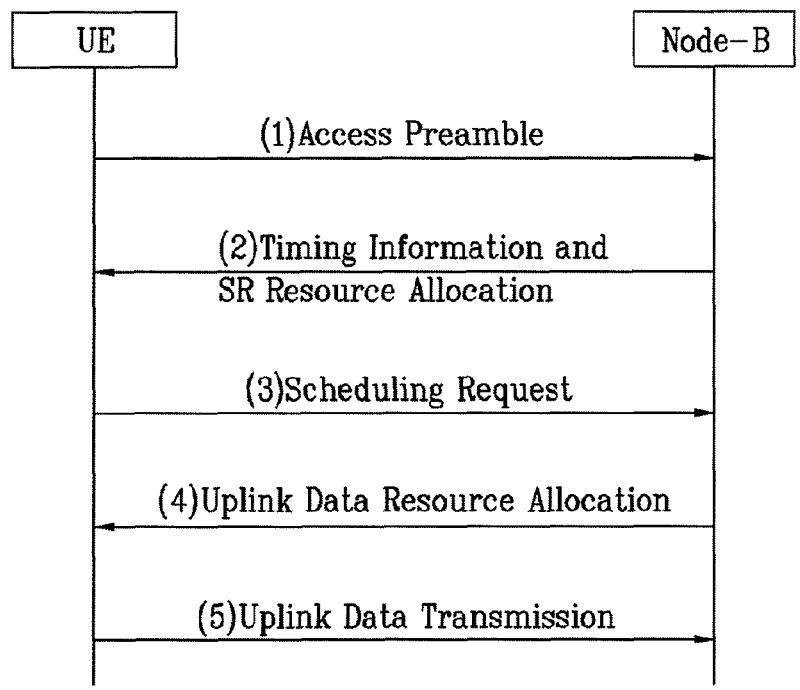
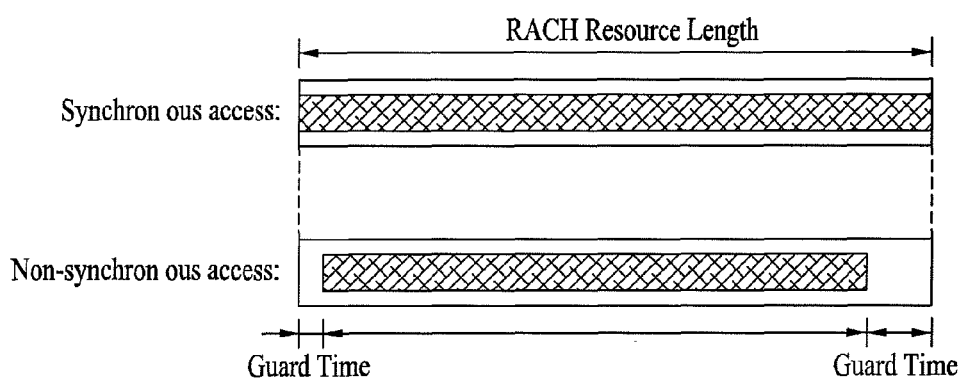
Figure 3

Multiple RACH slots per RACH period

METHOD FOR TRANSMITTING AND RECEIVING SIGNALS BASED ON SEGMENTED ACCESS SCHEME AND METHOD FOR ALLOCATING SEQUENCE FOR THE SAME

CROSS REFERENCE TO RELATED APPLICATIONS

This application is a continuation of U.S. application Ser. No. 12/440,869 filed Mar. 11, 2009, now U.S. Pat. No. 7,768,965, which is the National Phase of PCT/KR2007/004359 filed on Sep. 10, 2007, which claims priority under 35 U.S.C. 119(e) to U.S. Provisional Application No. 60/863,329 filed on Oct. 27, 2006, and under 35 U.S.C. 119(a) to Patent Application Nos. 10-2006-0087290 and 10-2006-0094103 filed in the Republic of Korea on Sep. 11, 2006, and Sep. 27, 2006 respectively, all of which are hereby expressly incorporated by reference into the present application.

TECHNICAL FIELD

The present invention relates to a wireless communication technology, and more particularly, to a method of allocating a sequence set for a random access channel based on a segmented access scheme in a communication system, an apparatus and method for transmitting and receiving signals using the sequence set, and an apparatus and method for searching a delay based sequence.

BACKGROUND ART

Generally, uplink channels for a currently discussed communication system include a random access channel (RACH or a ranging channel) for a user equipment to randomly access a base station, an uplink shared channel (e.g., HS-DPCCH) for carrying a channel quality indicator (CQI) and ACK/NACK information, and the like.

The RACH or ranging channel is a random access channel for a user equipment to perform downlink synchronization with a base station and can be found through bases station information. A location of a corresponding channel and the like can be acquired from the base station information. And, the RACH or ranging channel is a unique channel that can be accessed by a user terminal which is not synchronized with a base station yet.

If a user equipment transmits a signal to a corresponding base station on the RACH or ranging channel, the base station informs the user equipment of modification information on an uplink signal timing for synchronization with the base station and various information for the corresponding user equipment to be connected to the base station.

After a connection between the user equipment and the base station has been completed through the RACH or the ranging channel, communications can be carried out using other channels.

FIG. 1 and FIG. 2 are diagrams for examples of a process generated when a user equipment connects an uplink communication with a base station.

First of all, a user equipment can acquire both uplink and downlink synchronizations with a base station by accessing an RACH or a ranging channel. So, the user equipment is in a state capable of accessing the corresponding base station. FIG. 1 shows a situation that a user equipment is initially connected to a base station after a power of the user equipment has been turned on. FIG. 2 shows that a user equipment having performed initial synchronization with a base station accesses the base station if the synchronization is mismatched or if a request for an uplink resource needs to be made (i.e., if a resource for uplink transmission data is requested).

In a step (1) of FIG. 1 or FIG. 2, a user equipment transmits an access preamble and a message to a base station if necessary. The base station recognizes why the corresponding user equipment accesses an RACH or a ranging channel and then makes an action for a corresponding process.

In case of the initial access shown in FIG. 1 or FIG. 2, the base station allocates timing information and an uplink data resource to the corresponding user equipment in steps (2) and (3). So, the user equipment is able to transmit uplink data in a step (4).

FIG. 2 shows an example of a case that the user equipment accesses the RACH or the ranging channel in the step (1) because of a scheduling request (hereinafter abbreviated SR). In the step (2), the base station performs resource allocation for the timing information and the SR to the user equipment. For the SR (step (3)) of the user equipment, the base station performs uplink data resource allocation [step (4)] to enable the user equipment to perform uplink data transmission [step (5)]. In case that the SR is transmitted on a random access channel, it means a case that the user equipment having been in an idle/sleep mode for a long time is decided to have a timing mismatched with that of the base station. So, this scheme enables both of the timing information and the resource allocation request to be handled at a time.

In accessing the RACH or the ranging channel, in case of the case shown in FIG. 2 instead of the initial access, a different signal is usable according to whether a signal carried on the RACH or the ranging channel is matched in synchronization with the base station.

FIG. 3 is a diagram for a structure of an RACH or a ranging channel used for a synchronous/asynchronous access.

In case of a synchronized access, a user equipment having performed synchronization with a base station makes an access to a RACH or a ranging channel in a situation that the synchronization is maintained (synchronization can be maintained through control information such as a downlink signal or a CQ pilot transmitted in uplink). And, the base station is facilitated to recognize a signal carried on the RACH or the ranging channel.

Since the synchronization is being maintained, the user equipment, as shown in an upper part of FIG. 3, is able to use a longer sequence or further transmit additional data.

In case of a non-synchronized access, when a user equipment makes an access to a base station, if synchronization is mismatched due to some cause, a guard time, as shown in a lower part of FIG. 3, should be set in accessing an RACH or a ranging channel. The guard time is set by considering a maximum roundtrip delay that a user equipment attempting to receive a service within the base station can have.

The RACH or the ranging channel should vary in length according to a cell size of the base station. As the user equipment gets farther from the base station, a round-trip delay gets increased. And, this means that the guard time set for the user equipment in the non-synchronized access gets longer. If the cell size is increased, a path loss between the user equipment and the base station is increased. So, a signal needs to be transmitted by being spread longer, which is shown in FIG. 4.

FIG. 4 is a diagram to explain a cell size and a channel length.

Referring to FIG. 4, a length of a channel, and more particularly, a length of an RACH or a ranging channel is set proportional to a cell size at a place where a communication will be actually installed. FIG. 4 shows three kinds of RACHs according to a rule of categorizing cell sizes into a small cell size, a medium cell size, and a large cell size. And, a different sequence is applied to each of the RACHs respectively having three kinds of lengths, which is indicated by a different shaded portion. In particular, how an inside of a cell is segmented can be diversified according to a condition of a corresponding system. And, a scheme for extending the length of the RACH or the ranging channel and a sequence applied thereto can be diverse as well.

Meanwhile, a user equipment transmits a signal via an RACH or a ranging channel. This is because the user equipment can obtain a specific service in a manner of transmitting a selected sequence to a base station to match a synchronization of an uplink signal to the corresponding base station. To achieve this object, entire user equipments within an area defined as a cell should have success probability over a predetermined level regardless of a location of the corresponding user equipment. For this, in case that a cell size is small, a variation of an RACH or ranging channel resource is not considerable. So, a quantity occupied by an RACH or a ranging channel in an overall system is very small. For instance, in case that 1 subframe is used as an RACH or a ranging channel in 3GPP LTE system, the system uses ½0 of overhead as the RACH or the ranging channel. Yet, if 5 subframes need to be used due to an increased cell size, the overhead increases 5 times to considerably affect overall system performance.

As a scheme for reducing the overhead in a large cell, a method of changing a cycle of an RACH or a ranging channel can be taken into consideration. Yet, this method raises a problem that an access latency is elongated when a user equipment access the RACH or the ranging channel. And, it is also disadvantageous that probability of collision occurrence in an RACH or ranging channel slot is raised.

In case that entire user equipments within a large cell use an identically specified sequence, probability of collision in an RACH or ranging channel slot can be raised in proportion to an increasing number of user equipments within the corresponding cell.

Accordingly, the demand for a technology in reducing probability of collision occurrence in the same RACH or ranging channel slot and overhead attributed to an RACH or a ranging channel in a large cell has risen.

However, a detailed scheme for solving the problem has not been proposed.

DISCLOSURE OF THE INVENTION

Technical Object

Although a resource quantity of an RACH or a ranging channel increases according to a cell radius, this is just advantageous to UEs remote from a base station but may be unnecessary for UEs close to the base station.

As mentioned in the foregoing description, a path loss may appear differently for each UE due to a location within a cell and the like or a different requirement may rise for a frequency offset and the like according to a per UE speed.

Hence, by considering conditions for an RACH or a ranging channel for each UE to use an RACH or a ranging channel more effectively in case of a large cell radius, an RACH or ranging channel structure, interpretation of the RACH or the ranging channel, and a sequence applied as the corresponding RACH or ranging channel are designed. For this, the present invention proposes a segmented access scheme.

Accordingly, the present invention is directed to a method of allocating a sequence set for a random access channel based on a segmented access scheme in a communication system, an apparatus and method for transmitting and receiving signals using the sequence set, and an apparatus and method for searching a delay based sequence that substantially obviate one or more of the problems due to limitations and disadvantages of the related art.

An object of the present invention is to reduce probability of collision possible in using an identical sequence by entire user equipments within a cell in a manner of providing a sequence set differently allocated according to a location of a user equipment within a cell.

Another object of the present invention is to provide a method and apparatus for enabling a user equipment to transmit and receive signals using a sequence set.

Another object of the present invention is to provide a method and apparatus for reducing a load imposed on a base station in sequence search and a signal transmitting/receiving method using the same, in which a base station searches for a sequence used for an RACH or a ranging channel in a manner of selecting a sequence set to be searched by considering delay time of a reception signal, search complexity and the like and then deciding/searching which sequence is used as a sequence used for the received RACH or the ranging channel using the selected sequence.

Another object of the present invention is to provide a method and apparatus for reducing sequence dependency of information transfer in an RACH or a ranging channel, in which a UE inserts intentional delay information in a transmission signal as a means for indicating information to be delivered to a base station and in which the base station having received the signal obtains the corresponding information through a delayed extent of a reception signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, a signal transmitting method of a user equipment in a communication system according to one embodiment of the present invention is provided. For this, according to one embodiment of the present invention, a method of transmitting a signal of a user equipment in a communication system includes the steps of selecting a channel in accordance with at least one selected from the group consisting of a signal attenuation extent of a downlink signal to the user equipment, a speed of the user equipment and an intra-cell location of a user from channels differently provided based on at least one selected from the group consisting of the signal attenuation extent of the downlink signal and the speed of the user equipment; and transmitting the signal using the selected channel.

To further achieve these and other advantages and in accordance with the purpose of the present invention, according to another embodiment of the present invention, in a method that a specific user equipment transmits a signal via a random access channel, a signal transmitting method includes the steps of selecting at least one or more sequence sets according to an intra-cell location of the specific user equipment from total sequence sets allocated by being differently discriminated from each other according to the intra-cell location of each user equipment, selecting a prescribed sequence from the selected sequence set in accordance with transmission information of the specific user equipment, and then transmitting the selected sequence via the random access channel in accordance with a location of the user equipment (e.g., a transmission start time is chanted, a modulation scheme of the sequence itself is changed, or modulation applied to the sequence is changed, etc.).

To further achieve these and other advantages and in accordance with the purpose of the present invention, according to a further embodiment of the present invention, in a method of receiving a signal from at least one user equipment via a random access channel, a signal receiving method includes the steps of receiving a signal via the random access channel from the at least one user equipment and obtaining reception timing point information of the received signal and searching for a sequence used for the received signal using a search target sequence set differing in accordance with the reception timing point information by considering a delay time differing in accordance with an intra-cell location of the at least one user equipment.

To further achieve these and other advantages and in accordance with the purpose of the present invention, a sequence allocating method, a signal transmitting apparatus, and a signal receiving apparatus for the above embodiments of the present invention are provided.

It is to be understood that both the foregoing general description and the following detailed description are exemplary and explanatory and are intended to provide further explanation of the invention as claimed.

ADVANTAGEOUS EFFECTS

According to one embodiment of the present invention, a separate RACH or ranging channel is generated in accordance with a different condition for an RACH or a ranging channel per a user equipment and then used. Hence, overhead for the RACH or the ranging channel can be reduced.

According to one embodiment of the present invention, a sequence set for allocating a different number of sequences in accordance with a location of a user equipment within a cell is provided. Hence probability in collision, which may be generated in case that all user equipments within the cell use the same sequence, can be lowered.

In case that a user equipment additionally considers a cause why a user equipment attempts to access an RACH or a ranging channel, collision probability in the corresponding RACH or ranging channel can be more efficiently lowered. In particular, more efficient sequence allocation can be achieved in a manner of providing a sequence capable of obtaining a number of sequences proportional to a frequency of accessing an RACH or a ranging channel due to the corresponding cause within a specific cell region.

According to one embodiment of the present invention, when a base station searches for a sequence used for an RACH or a ranging channel, a sequence set to be searched is selected by considering a delay time of a reception signal and it is then searched which sequence is used for the received RACH or ranging channel using the selected sequence set. Hence, load imposed on the base station in sequence search can be reduced.

A UE inserts intentional delay information in a transmission signal as a means for indicating information to be delivered to a base station. The base station having received the signal obtains the corresponding information through a delayed extent of a reception signal. Hence, sequence dependency of information transfer in an RACH or a ranging channel can be lowered.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 and FIG. 2 are diagrams for examples of a process generated when a user equipment connects an uplink communication with a base station;

FIG. 3 is a diagram for a structure of an RACH or a ranging channel used for a synchronous/asynchronous access;

BEST MODE

Mode for Invention

Figure 1:
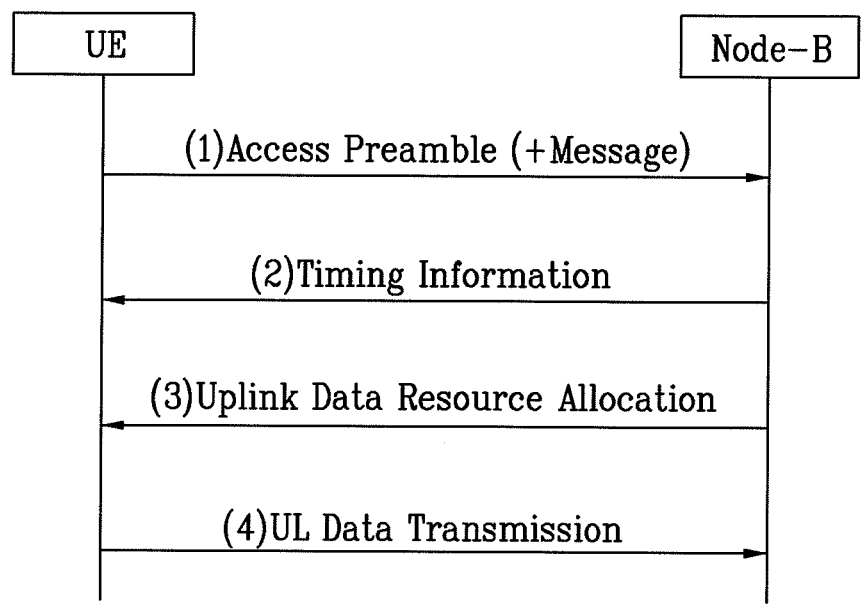
Figure 4:
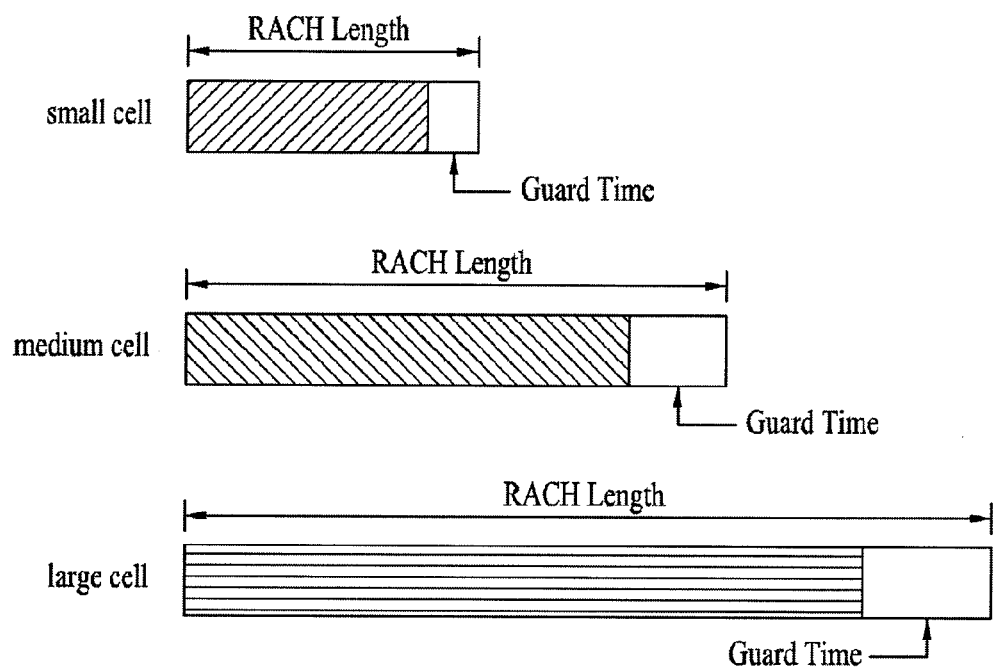
FIG. 4 is a diagram to explain a cell size and a channel length.

Reference will now be made in detail to the preferred embodiments of the present invention, examples of which are illustrated in the accompanying drawings.

The following detailed description disclosed together with the accompanying drawings intends to present not a unique embodiment of the present invention but an exemplary embodiment. The following details include particular details to provide complete understanding of the present invention. Yet, it is apparent to those skilled in the art that the present invention can be implemented without the particular details. For instance, in the following description, 'terminal' is described as a subject to transmit an uplink signal and 'base station' is described as a receiving subject. Theses terminologies do not put limitation of the present invention. So, 'user equipment' can be used as an uplink transmission subject and 'node B' can be used as a receiving subject, for example.

In some case, a structure or device known to public is omitted to avoid conceptional vagueness of the present invention or depicted as a block diagram centering on core functions of the structure or the device. And, the same reference numbers are designated the same elements in this closure overall.

First of all, a basic requisite for an RACH or a ranging channel is to meet requisites for a roundtrip delay and a path loss regardless of a UE speed, a frequency offset, a cell size, and the like. Assumptions for basic RACH or ranging channel allocation (e.g., working assumption of 3GPP LTE) include a preamble length 0.8 ms, a guard time 100 μs, and a 1 ms RACH or ranging channel capable of covering 15 km. Yet, since a cell size exceeds 15 Km, it may happen a case that an RACH or a ranging channel should cover 30 Km section.

Meanwhile, in designing an RACH or a ranging channel to support such a large cell, predetermined limitation is put on a frequency offset in such a manner that a number of ZCZ sequences available for a sequence design is limited. So, a sequence reuse factor can be reduced. And, it can be observed that a repetitive preamble has performance better than that in case of using a short preamble simply.

Thus, in order to design an RACH or ranging channel structure to support a large cell, various factors should be taken into consideration. In this case, the carious factors include: (1) a number of available sequences to prepare for a reduction of ZCZ sequences due to a cell size increase and a reduction of a corresponding overall sequence reuse factor; (2) a preamble repetition number enough to cope with a frequency offset; (3) RACH or ranging channel overhead that may be generated in case of designing an RACH or a ranging channel to support a large cell, e.g., designing an RACH or a ranging channel across a plurality of TTIs, designing an RACH or a ranging channel across a wide bandwidth, etc.; and (4) a number of TTIs for an RACH or a ranging channel, an antenna length in a base station, and the like.

Each embodiment of the present invention explained in the following description considers the above factors taken into consideration in designing the RACH or ranging channel structure. Particularly, locations of UEs within a cell, a downlink signal state measured by a UE in correspondence to the measured location, and the like are additionally taken into consideration to intensively disclose a scheme for reducing overhead generated from an RACH or ranging channel design to support a large cell.

For this, one embodiment of the present invention proposes an RACH or ranging channel structure and/or a method of providing a sequence applied thereto by considering the aforesaid RACH or ranging channel factors differently requested for each UE within a cell.

Another embodiment of the present invention proposes a method of providing a sequence set for an RACH or a ranging channel differently to meet different requisites regarding why a UE accesses an RACH or a ranging channel and a location of a UE within a cell to reduce collision probability in a random access.

And, a further embodiment of the present invention proposes a method of facilitating a receiving side to detect a sequence carried on an RACH or a ranging channel using a different delay time depending on a location of each UE within a cell.

In order to reduce RACH or ranging channel overhead and decrease collision probability in a corresponding RACH or ranging channel, it should be considered that a different requisite for the RACH or the ranging channel is generated in accordance with a location of a user equipment.

Figure 5:
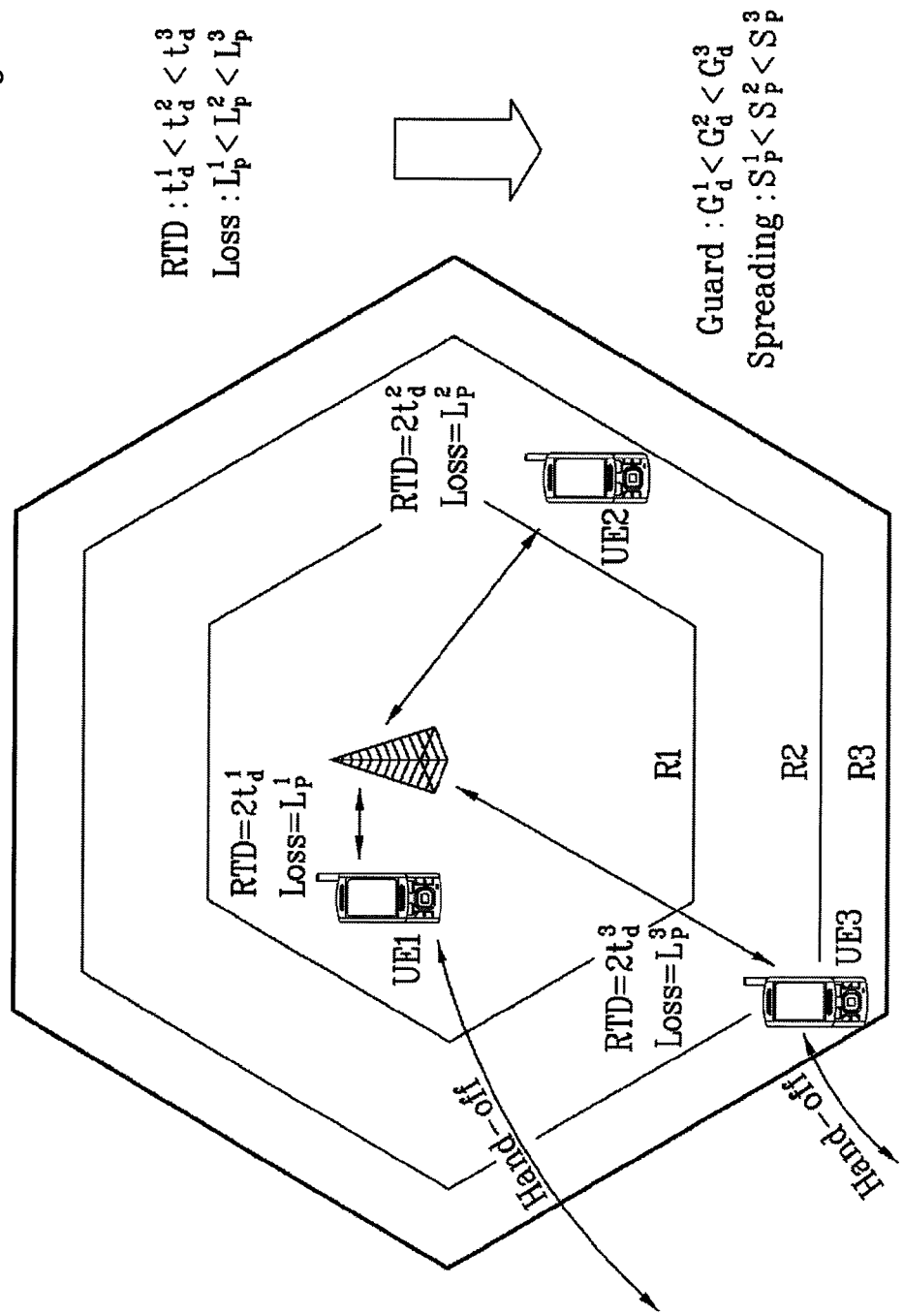
FIG. 5 is a diagram to explain a condition differently requested in accordance with a location of a UE within a cell.

FIG. 5 is a diagram to explain a condition differently requested in accordance with a location of a UE within a cell.

In FIG. 5, a most outer edge region of a cell supported by a cell is represented as R3 and a UE lies in the region R3 is represented as UE3. A region in the middle of the cell is represented as R2 and a UE lies in the region R2 is represented as UE2. A region closest to the base station is represented as a region R1 and a UE lies in the region R1 is represented as UE1. And, each case is exemplarily depicted in FIG. 5.

In FIG. 5, path losses of UE1, UE2 and UE3 are represented as $L_p^1$, $L_p^2$ and $L_p^3$ and roundtrip delays (RTDs) are represented as $2t_d^1$, $2t_d^2$ and $2t_d^3$, respectively. In this case, $2t_d^1$, $2t_d^2$ and $2t_d^3$ indicate that roundtrip delays are twice greater than delays $t_d^1$, $t_d^2$ and $t_d^3$ taken for unidirectional transmissions, respectively.

Generally, path losses are ordered as $L_p^1 < L_p^2 < L_p^3$ in correspondence to an order of distance. Likewise, roundtrip delays are ordered as $2t_d^1 < 2t_d^2 < 2t_d^3$. So, guard section lengths $G_d^1$, $G_d^2$ and $G_d^3$ necessary according to positions of UE1, UE2 and UE3 within a cell correspond to $G_d^1 < G_d^2 < G_d^3$. And, spreading coefficients $S_p^1$, $S_p^2$ and $S_p^3$ of sequences to be applied to a channel also have the relation of $S_p^1 < S_p^2 < S_p^3$.

Namely, the UE3 has to access an RACH or a ranging channel with a long RACH or ranging channel and a sequence having a high spreading coefficient in order to have performance equal to that of the UE1 which accesses an RACH or a ranging channel with a shorter RACH or ranging channel and a low spreading coefficient.

In case of the UE1, an RACH or a ranging channel allocated by a base station is used. Yet, if a cell radius is large, a size of the RACH or the ranging channel is designed to fir the condition for supporting a UE at an edge of the cell (e.g., UE3).

Hence, it may happen that a UE in the vicinity of the base station, e.g., UE1 does not actually need such a long RACH or ranging channel.

In particular, if a base station and a user equipment get closer to each other, an RACH or ranging channel having a short length is enough. Moreover, since a length of the RACH or ranging channel is short, a length of a sequence the user equipment should transmit can be decreased. Namely, if a location of a user equipment is known rather than all the user equipments identically use a single long RACH or ranging channel, it is quite correct that an RACH or ranging channel length and a sequence are suitably selected by obtaining the location to which the user equipment belongs.

In FIG. 5, unlike user equipments in the region R3, a shorter RACH or ranging channel is sufficient for the user equipment in the region R1 or R2 within the cell. This is because it is advantageous that a path loss of a signal due to a short distance gets smaller with an RACH or ranging channel having a short distance from a base station. So, if a user equipment belonging to the region R1 or R2 accesses an RACH or ranging channel designed for the region R3 as it is, it is apparent that loss is inevitable.

As mentioned in the foregoing description, the method of reducing the RACH or ranging channel overhead using the RACH or ranging channel having a proper length according to a location of UE in a large cell is well disclosed in Korean Patent Application No. 2006-74764 for 'Signal transmitting and receiving method in communication system, apparatus therefore, and channel structure use for the same' applied for a patent by the present applicant.

In the following description, instead of setting an RACH or a ranging channel to meet the common requisites for entire UEs in a cell, all the schemes for setting requisites for an RACH or a ranging channel to differ in accordance with a location of each UE within a cell is generically named 'segmented access scheme'.

And, as mentioned in the foregoing description, the factors required for a RACH or a ranging channel in accordance with a UE can be designed different in correspondence to a degree of path loss of a downlink signal generated to correspond to the location of the UE within the cell.

Moreover, if a specific UE is a high speed UE, it can be more sensitive to an influence of a frequency offset in an RACH or ranging channel design than a low speed UE. For this, it may be more advantageous that repetition of an RACH or ranging channel preamble or the like is used.

Hence, according to one embodiment of the present invention, a method of providing a different RACH or ranging channel structure by considering factors for an RACH or a ranging channel differently requested per a UE in the RACH or the ranging channel within a cell and/or a sequence applied thereto are provided as an example for the above-mentioned segmented access scheme. And, this is explained as a first embodiment of the present invention in the following description.

According to another embodiment of the present invention, a method of reducing collision probability in an RACH or a ranging channel by differently allocating a sequence in correspondence to a location of a UE or a cause why a UE accesses the RACH or the ranging channel and using the differently allocated sequence in the RACH or the ranging channel is provided as an example for the above-mentioned segmented access scheme. And, this is explained as a second embodiment of the present invention in the following description.

According to a further embodiment of the present invention, to solve a problem that a sequence detection in a receiving side becomes complicated if a sequence configuration is diversified to correspond to a different requisite requested per a UE, a signal receiving method of detecting a sequence used for an RACH or a ranging channel by considering a different delay time in correspondence to a location of each UE is provided. And, this is explained as a third embodiment of the present invention in the following description.

An aspect of adjusting a setup for an RACH or a ranging channel based on a location of a UE within a cell is common to the respective embodiments of the present invention. The first embodiment intensively deals with an aspect of an RACH or a ranging channel and a sequence itself applied to the RACH or the ranging channel. The second embodiment intensively deals with an aspect of transmitting an RACH or a ranging channel. And, the third embodiment intensively deals with an aspect of receiving an RACH or a ranging channel. Yet, schemes according to the embodiments of the present invention can be suitably combined with each other to be used by transmitting and receiving sides.

The first embodiment of the present invention is explained as follows.

First Embodiment

For clarity and facilitation of the following description, a central region is represented as R1 and a cell edge region is represented as R2. Yet, a specific boundary value can be varied to correspond to various conditions. And, a boundary number can be varied to correspond to a condition as well.

Figure 6:
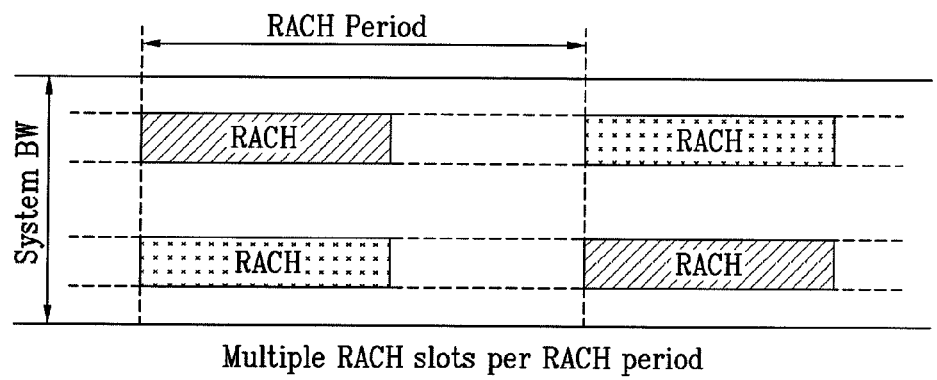
FIG. 6 and FIG. 7 are diagrams of schemes for allocating an identical RACH or ranging channel to all UEs.
Figure 7:
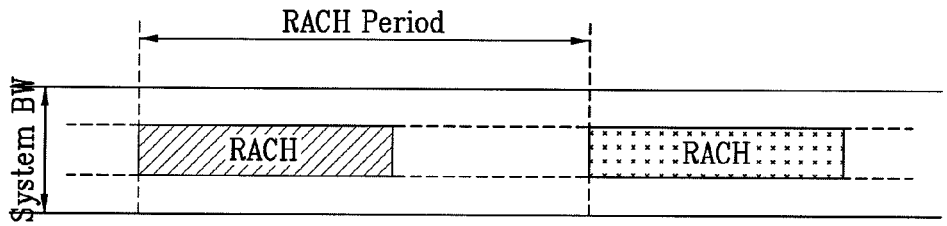

FIG. 6 and FIG. 7 are diagrams of schemes for allocating an identical RACH or ranging channel to all UEs.

As mentioned in the foregoing description, if an RACH or a ranging channel is allocated without considering a condition, which is differently demanded in correspondence to a location of a UE within a cell, for the RACH or the ranging channel, a corresponding allocating scheme is shown in FIG. 6 or FIG. 7.

In this case, a base station simply allocates an RACH or a ranging channel to each UE for each RACH or ranging channel section without considering an RACH or ranging channel condition per a UE. So, signaling overhead is small. Yet, since the corresponding RACH or ranging channel has an RACH or ranging channel structure to support a poorest UE within a cell, overhead can be large for an RACH or ranging channel structure to support a large cell overall.

Hence, according to one embodiment of the present invention, a scheme for providing an RACH or ranging channel structure to meet an RACH or ranging channel requisite for each UE and selecting the corresponding structure in correspondence to a location of the corresponding UE within a cell, a CQ decision or the like is proposed. This is explained as follows.

Figure 8:
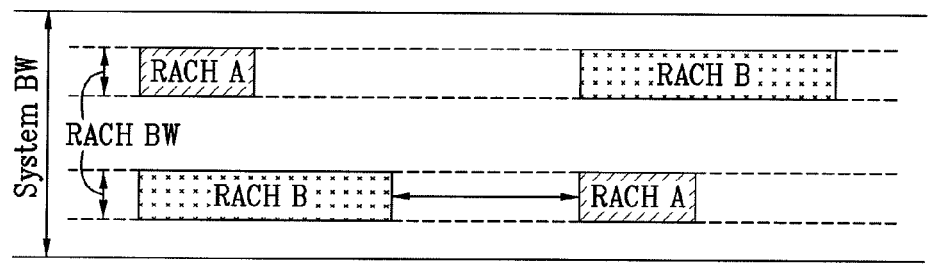
FIG. 8 and FIG. 9 are diagrams of schemes for allocating an RACH or a ranging channel having a different time domain length in correspondence to a different condition for each UE according to one embodiment of the present invention.
Figure 9:
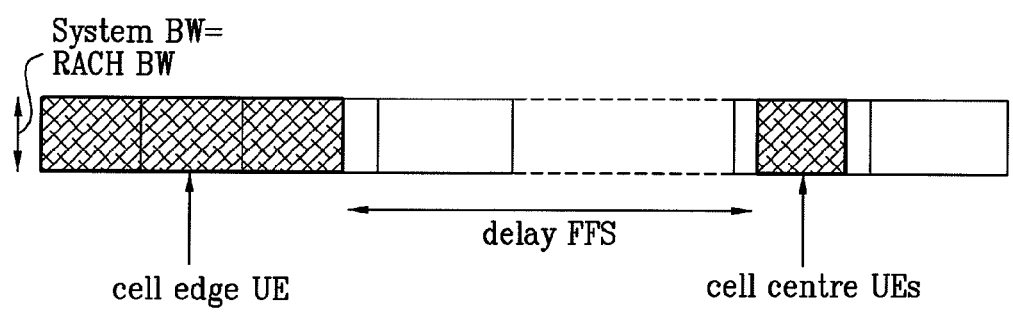

FIG. 8 and FIG. 9 are diagrams of schemes for allocating an RACH or a ranging channel having a different time domain length in correspondence to a different requisite for each UE according to one embodiment of the present invention.

First of all, an RACH or a ranging channel is provided by a base station to enable a UE failing to be connected to or synchronized with the base station to access the corresponding base station and then notified to the corresponding UE. So, the RACH or the ranging channel enables a random UE to access the base station. Yet, since a corresponding length is increased in a large cell, the base station is unable to frequently generate and provide an RACH or a ranging channel to utilize a resource for a data area. To prevent this, channels differing in length are opened in generating the RACH or the ranging channel and UEs located in different regions are accessible to the channels differing in length.

In particular, in actually allocating RACHs or ranging channels, as shown in FIG. 9, a short RACH or ranging channel (e.g., RACH A) and a long RACH or ranging channel (e.g., RACH B) are utilized for UEs located in R1 (or UEs having a corresponding CQ value measured: same in the following description) (long RACH or ranging channel can meet the RACH or ranging channel requisite for UEs located in R1). And, UEs located in R2 are allowed to use a long RACH or ranging channel (e.g., RACH B) only.

By performing the allocation shown in FIG. 8, collision probability between UEs can be reduced. And, it is also advantageous in that access latency is not varied in accessing an RACH or a ranging channel by a transmitting terminal. Nonetheless, it can be observed that a quantity of a resource allocated to the RACH or the ranging channel by the base station is reduced smaller than an overhead generated from allocating the entire resource long.

In this case, the RACH A and the RACH B are represented as RACHs or ranging channels allocated with different probabilities by the base station, respectively. And, these probabilities are set to minimize a whole collision probability in accordance with the R1 and R2 sizes or UE distribution.

If a bandwidth of an RACH or a ranging channel is equal to that of a system or if it is impossible to allocate at least two RACHs or ranging channels to a frequency domain at a time, a long RACH and a short RACH, as shown in FIG. 9, alternately appears according to the given frequency with cycles adjusted by the base station in the above-explained allocation scheme.

The scheme of allocating an identical RACH or ranging channel regardless of a requisite for each UE in FIG. 6 and FIG. 7 and the scheme of allocating a different RACH or ranging channel by considering a requisite for each UE in FIG. 8 and FIG. 9 are compared to each other in aspect of overhead as follows.

ment of the present invention (i.e., Case 2-Segmented) obtains an overhead reduced 25% smaller than that of the other case (i.e., Case 2).

Comparing 'Case 3' to 'Case 3-Segmented' to each other, it can be observed that one case according to one embodiment of the present invention (i.e., Case 3-Segmented) obtains an overhead reduced about 33.3% smaller than that of the other case (i.e., Case 3).

As mentioned in the foregoing description, a scheme for enabling UEs in each region within a cell to have different widths on a frequency domain can be provided as well as a scheme for providing UEs in each region within a cell to have different lengths on a time domain.

In the description of the above-explained embodiment of the present invention, a UE, which is located in each region within a cell according to the embodiment for providing a requisite for an RACH or ranging channel based on a location of the UE within the cell, can be applied to correspond to a UE having a CQ value and speed corresponding to each case according to an embodiment for providing an RACH or ranging channel requisite in accordance with a downlink signal attenuation degree (e.g., CQ information) measured by the UE, a speed of the corresponding UE, and the like.

Meanwhile, as a number of available ZCZ sequences in accordance with an increase of a roundtrip time in a large cell is decreased, there rises a problem that a sequence reuse is reduced overall. And, as mentioned in the foregoing description, a preamble needs to be repeated for a UE having a high path loss and a high speed in a large cell.

Hence, another embodiment of the present invention proposes a scheme for increasing a quantity of information that

TABLE 1

| UL System BW (MHz) | | | 1.25 | 2.5 | 5 | 10 | 15 | 20 |
|---|---|---|---|---|---|---|---|---|
| RACH Slots per Assignment (Ns) | | | <=1 | <=2 | <=4 | <=8 | <=12 | <=16 |
| RACH Overhead Case 1 | P | 10 | 0.100 | 0.050 | 0.025 | 0.013 | 0.008 | 0.006 |
| | Ns | 1 | | | | | | |
| | N | 1 | | | | | | |
| RACH Overhead Case 2 | P | 10 | 0.200 | 0.100 | 0.050 | 0.025 | 0.017 | 0.013 |
| | Ns | 1 | | | | | | |
| | N | 2 | | | | | | |
| RACH Overhead Case 3 | P | 10 | 0.300 | 0.150 | 0.075 | 0.038 | 0.025 | 0.019 |
| | Ns | 1 | | | | | | |
| | N | 3 | | | | | | |
| RACH Overhead Case 2 - Segmented | P | 10 | 0.150 | 0.075 | 0.038 | 0.019 | 0.013 | 0.009 |
| | Ns | 1 | | | | | | |
| | N | 2 | | | | | | |
| | SR | 0.50 | | | | | | |
| | Reduction (%) | | 25.000 | 25.000 | 25.000 | 25.000 | 25.000 | 25.000 |
| RACH Overhead Case 3 - Segmented | P | 10 | 0.200 | 0.100 | 0.050 | 0.025 | 0.017 | 0.013 |
| | Ns | 1 | | | | | | |
| | N | 3 | | | | | | |
| | SR | 0.50 | | | | | | |
| | Reduction (%) | | 33.333 | 33.333 | 33.333 | 33.333 | 33.333 | 33.333 |

In Table 1, 'p' indicates an RACH or ranging channel period by a unit of ms. 'Ns' indicates a number of RACH or ranging channel slots per an RACH or ranging channel periods, 'N' indicates an RACH or ranging channel length by a unit of ms, and 'SR' indicates a rate of an RACH or ranging channel slot having a length of 1TTI.

Comparing 'Case 2' and 'Case 2-Segmented' in Table 1 to each other, it can be observed that one case of applying a scheme for providing and assigning a different RACH or ranging channel structure in accordance with an RACH or ranging channel requisite per a UE according to one embodican be delivered using a limited sequence in a manner of using preamble repetition as information of UE, e.g., CQ information.

Figure 10:
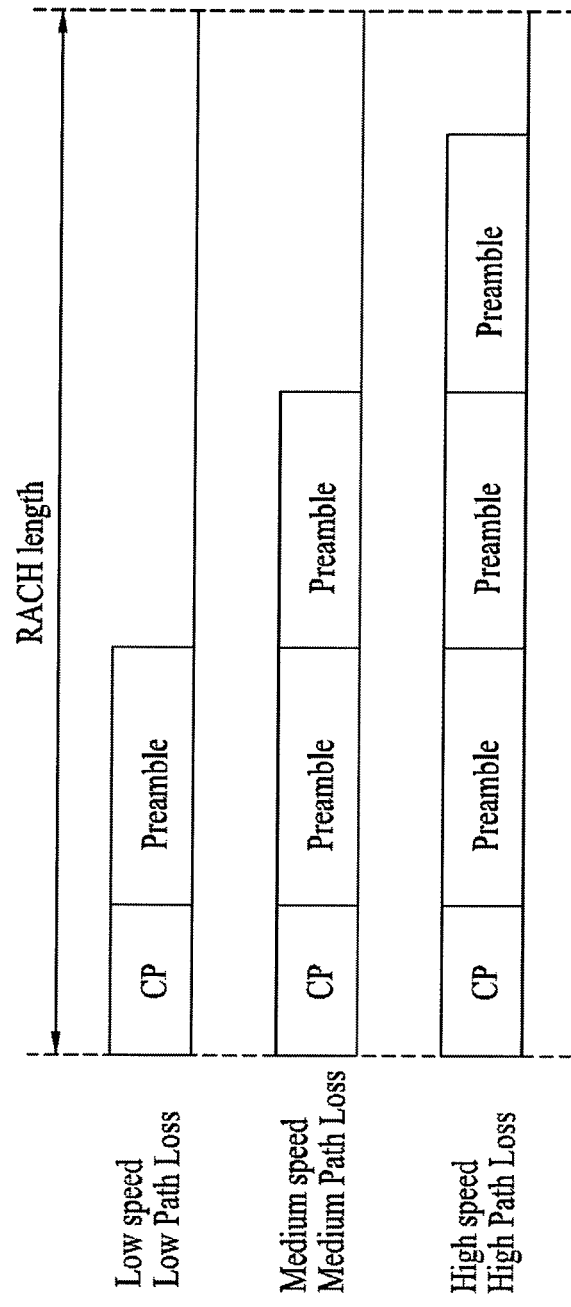
FIG. 10 is a diagram to explain a method of delivering UE information in correspondence to a preamble repetition count of an RACH or a ranging channel according to one embodiment of the present invention.

FIG. 10 is a diagram to explain a method of delivering UE information in correspondence to a preamble repetition count of an RACH or a ranging channel according to one embodiment of the present invention.

First of all, a first RACH or ranging channel structure in an upper end of FIG. 10 represents that a UE having a low speed and a low path loss delivers its CQ information using a single preamble. A second RACH or ranging channel structure represents that a UE having a medium speed and a medium path loss delivers its CQ information by repeating a preamble twice. And, a last RACH or ranging channel structure having a high speed and a high path loss delivers its CQ information by repeating a preamble three times. Thus, the different requisite for each UE may correspond to a condition in accordance with a location of the corresponding UE within a cell.

Referring to FIG. 10, it is able to deliver more information using a limited sequence in a manner of delivering UE information in accordance with a preamble repetition count.

As mentioned in the above description, a segmented access scheme for configuring an RACH or a ranging channel by considering a different RACH or ranging channel requisite per a UE according to a first embodiment of the present invention has been intensively explained.

A second embodiment of the present invention is explained as follows.

Second Embodiment

Despite UEs within a same cell explained in the description of FIG. 5, a different condition for an RACH or a ranging channel can be demanded in accordance with a location of each UE within a cell.

Meanwhile, a different condition demanded for an RACH or a ranging channel in accordance with a location of UE includes not only the aforesaid RACH or ranging channel length but also a cause for a UE to access an RACH or a ranging channel. Due to this cause, a frequency in accessing the RACH or the ranging channel may differ.

For instance, a UE (e.g., UE3) located on a cell edge, as shown in FIG. 5, may have a more frequency number in accessing an RACH or a ranging channel due to handoff into a neighbor cell than a UE (e.g., UE1) located in a cell center.

On the other hand, the UE1 located at the cell center has to substantially move into a cell edge from the cell center in advance prior to moving into the neighbor cell. So, it is very less probable that direct handoff may happen in the region R1.

Hence, a second embodiment of the present invention proposes a method of reducing collision probability in an RACH or a ranging channel in a manner of varying a number of sequences to be used for the RACH or the ranging channel in accordance with where a UE exists within a cell.

Generally, in a real system, a method of notifying a cause why a UE accesses a base station, a downlink CQI, a resource request, and the like using a sequence allocated to an RACH or a ranging channel is needed.

In this case, the reason why a user equipment uses an RACH or a ranging channel is because a great deal of weight is placed on handoff and because newly powered-on user equipments or user equipments waking from idle mode use signals suitable for their situations, respectively.

The downlink CQI is needed for a user equipment to select a good channel when a base station detects a signal carried on an RACH or a ranging channel and then allocates a corresponding resource to the user equipment having accessed the RACH or the ranging channel.

And, the resource request indicates a requirement for a user equipment to transmit data traffic in uplink.

If a number of sequences allocated to an RACH or a ranging channel is N for example, the N sequences should represent a combination of the above-explained informations that should be transmitted to a base station via the RACH or the ranging channel.

Theses informations can be easily represented by a method of rendering each of the informations into a bit sequence and selecting one from a set of N sequences using the bit sequence as an index.

Figure 11:
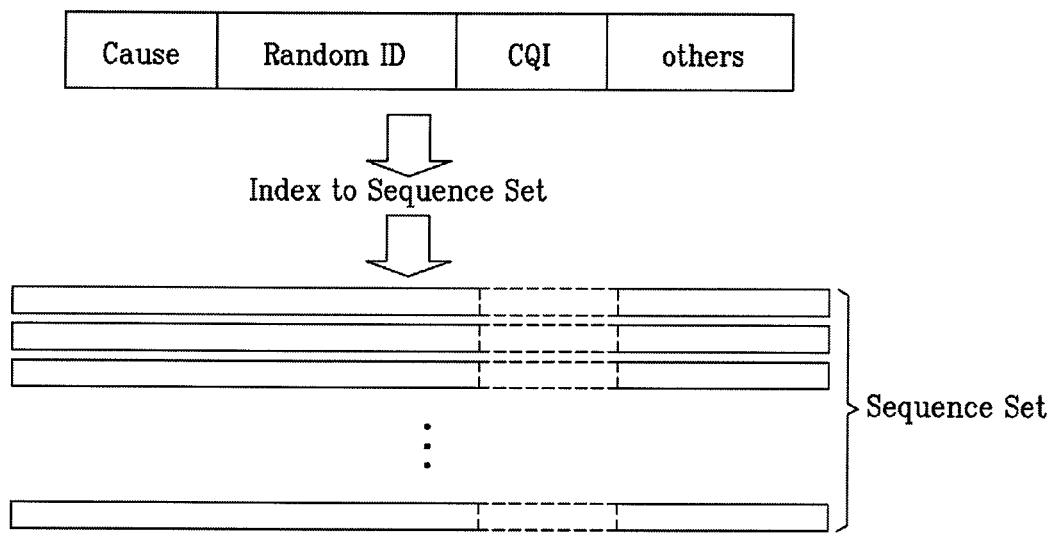
FIG. 11 is a diagram for a structure of a sequence set for generating information in a bitmap format.

FIG. 11 is a diagram for a structure of a sequence set for generating information in a bitmap format.

FIG. 11 shows types of information delivered to a base station via an RACH or a ranging channel include a cause for accessing an RACH or a ranging channel, a random ID, a CQI, and the like. A bitmap format shown in FIG. 11 to have an identical bit number for each information is applied in common to entire UEs within a corresponding cell. Yet, a corresponding sequence is selected from suitable sequences each of which indicates corresponding information via a bit number assigned to each information. Namely, in FIG. 11, the entire UEs within the cell use a same sequence set.

The above scheme is convenient for implementation but may be disadvantageous as a method for reducing collision in an RACH or a ranging channel. This is because a cause for a user equipment to access an RACH or a ranging channel and a frequency number for accessing the RACH or the ranging channel with each cause may totally differ from each other and because it may be inefficient for the entire user equipments to use the sequence selected from the sequence set having the bitmap structure regardless of the frequency number.

For instance, a type of a user equipment accessing an RACH or a ranging channel most frequently corresponds to a handoff user equipment. And, a user equipment having a power turned on, a user equipment making a request for a resource, a user equipment performing timing synchronization, and the like follow the handoff user equipment in order. Os, if more protection is carried out on the most frequently occurring case, it is able to reduce probability of collision occurrence between user equipments in the same RACH or ranging channel.

More preferably, a sequence set suitable for each case is allocated to keep collision probability below a prescribed level by inquiring into a distribution of causes for accessing the RACH or the ranging channel.

Thus, according to one embodiment of the present invention proposes a method of reducing collision probability in an RACH or a ranging channel by providing a sequence set including a sequence number differing in accordance with a cause for a user equipment to access the RACH or the ranging channel as well as a current location of a user equipment within a cell.

Figure 12:
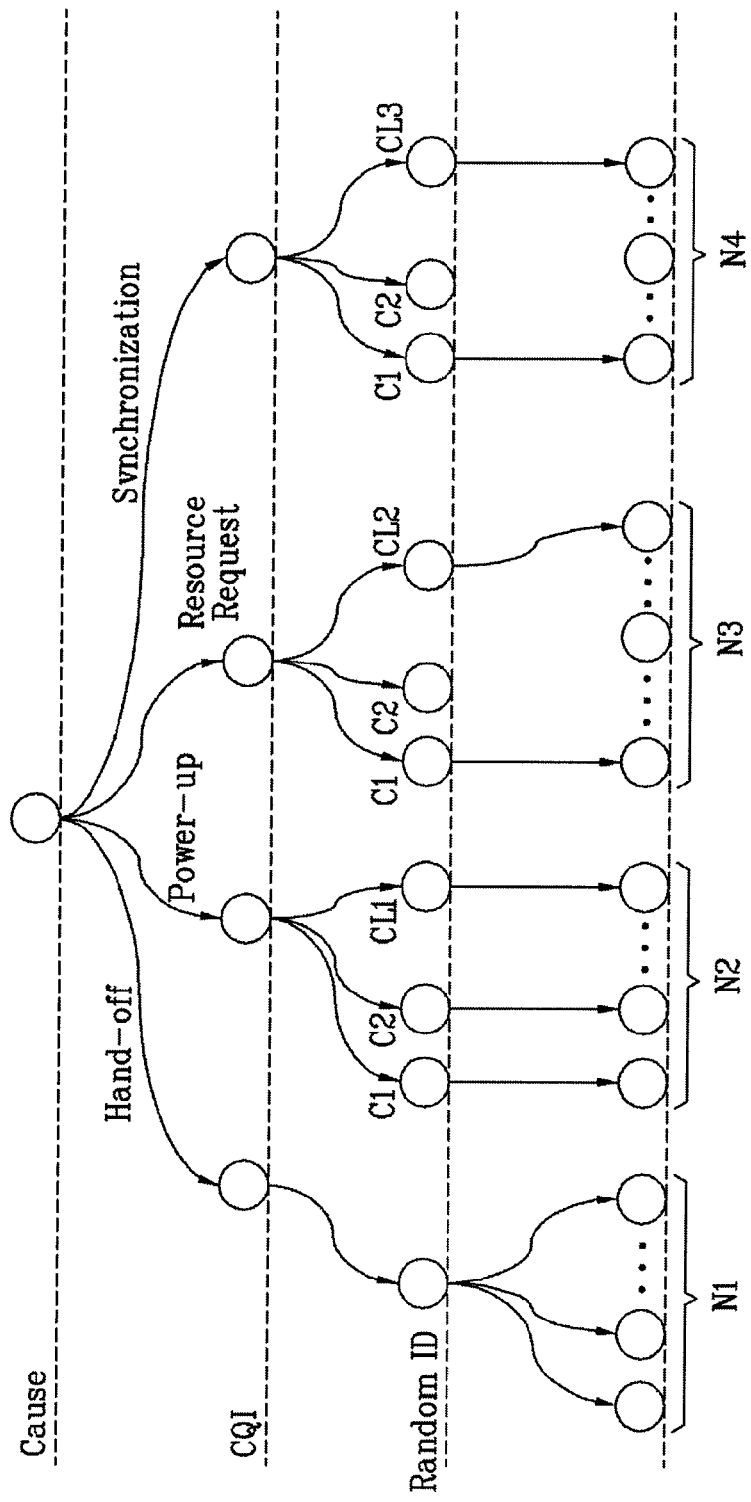
FIG. 12 is a diagram of a example for differentiating a number of CQIs and a number of random IDs due to a cause for a user equipment to access an RACH or a ranging channel according to one embodiment of the present invention.

FIG. 12 is a diagram of a example for differentiating a number of CQIs and a number of random IDs due to a cause for a user equipment to access an RACH or a ranging channel according to one embodiment of the present invention.

FIG. 12 shows a case that a user equipment accesses an RACH or a ranging channel due to a cause of handoff. Resource allocation request (Resource Request), or synchronization. And, FIG. 12 shows that each of the causes can be represented as a single number of cases (yet, unlike the drawing of FIG. 12, it is apparent to those skilled in the art that each of the causes can be represented as more number of cases in accordance with a number of available sequences and a number of RACH or ranging channel access causes.).

Moreover, FIG. 12 shows a single CQI is allocated to each of the causes since information report for a downlink channel status is relatively unnecessary in case of handoff for example, and also show that CL1, CL2 and CL3 CQIs are allocated to the cases of the power-on, the resource request and the synchronization, respectively.

Meanwhile, in case of the handoff occurring by the most frequency number among the shown causes, numerous random IDs are allocated to accommodate more user equipments to access an RACH or a ranging channel. In case of other causes, a less number of random IDs are allocated.

Thus, by providing a sequence set, in which numbers N1, N2, N3 and N4 of sequences indicating corresponding information in accordance with the cause for a user equipment to access an RACH or a ranging channel are specified, the following effect can be brought.

Once the number of sequences, as shown in FIG. 12, is assigned according to each cause for accessing an RACH or a ranging channel, it is decided as one since a variation of CQI is small in case of the handoff frequently used by a user equipment, as mentioned in the foregoing description for example. Instead, more random IDs are assigned. Hence, it is able to reduce collision probability by lowering probability in having the same sequence selected despite accesses made by several user equipments. In particular, in case of using sequences amounting to a different number of cases according to a cause for a user equipment to access an RACH or a ranging channel, collision probability in the RACH or the ranging channel can be lowered.

This scheme can be applied together with the aforesaid segmented access scheme. A user equipment located at a cell center in a relatively large cell and a user equipment located at a cell edge explicitly differ from each other in the cause for accessing an RACH or a ranging channel.

For instance, since a user equipment located at a cell center has no reason to perform handoff, a sequence may not be allocated for that use at all. Yet, it may be more preferable that a minimum handoff sequence is allocated for compatibility.

Meanwhile, in case that a power is turned on, the resource request or the like is more frequently generated within a cell than the handoff. So, sequences reduced for allocation to the handoff can be additionally allocated for these causes.

On the contrary, in case of a user equipment located at a cell edge, it is highly probable that handoff into a neighbor cell may be frequently used. So, an RACH or ranging channel ratio using handoff is very high. So, it is preferable that a number sequences corresponding to handoff is increased at the cell edge.

Namely, if a cell is discriminated by a distance from a base station, frequency of an RACH or ranging channel access cause for each user equipment in a corresponding region varies. So, it is able to allocate a sequence using this factor.

Figure 13:
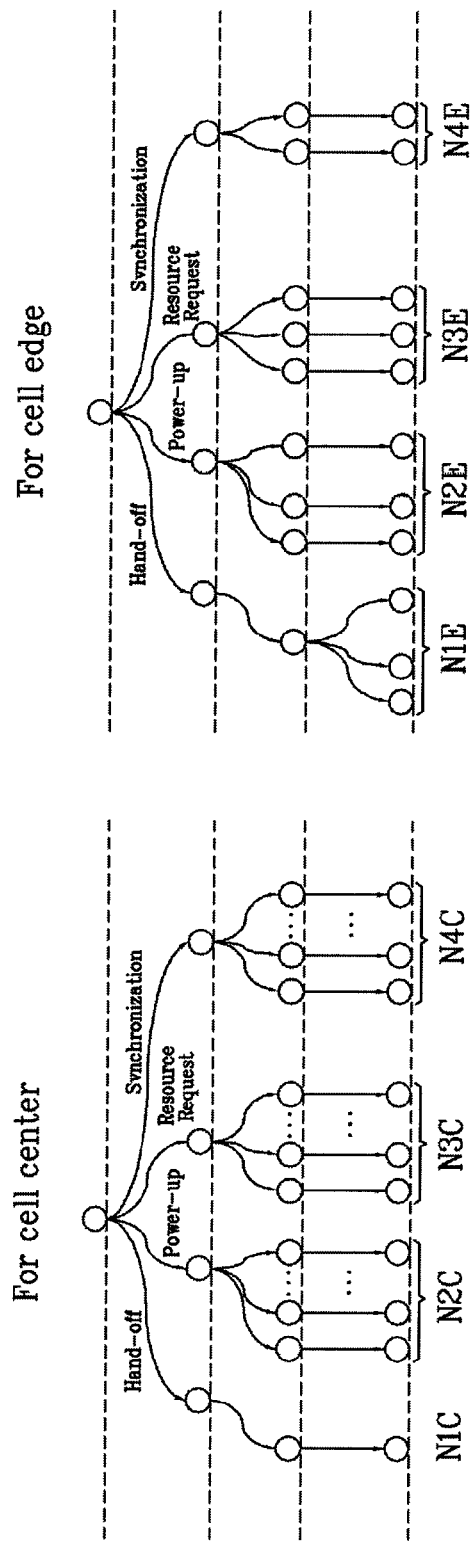
FIG. 13 is a diagram of a example for differentiating a number of CQIs and a number of random IDs in correspondence to a cause for a user equipment to access an RACH or a ranging channel and a location of the user equipment within a cell according to one embodiment of the present invention.

FIG. 13 is a diagram of a example for differentiating a number of CQIs and a number of random IDs in correspondence to a cause for a user equipment to access an RACH or a ranging channel and a location of the user equipment within a cell according to one embodiment of the present invention.

For instance, a number of sequences available for representing each information in FIG. 13 can be provided as follows.

1) Case of Handoff: N1C in sequence for user equipment at cell center<<N1E in sequence for user equipment at cell edge 2) Case of Power-on: N2C in sequence for user equipment at cell center>N2E in sequence for user equipment at cell edge 3) Case of Resource Request: N3C in sequence for user equipment at cell center>N3E in sequence for user equipment at cell edge 4) Case of Synchronization: N4C in sequence for user equipment at cell center>N4E in sequence for user equipment at cell edge Namely, in the above-explained example, 8 kinds of sequence sets can be provided according to a location of a user equipment within a cell and a cause for a user equipment to access an RACH or a ranging channel (e.g., a set of N1C sequence to represent a case of handoff of a cell center user equipment, a set of N1E sequences representing handoff of a cell edge user equipment, etc.).

Thus, in a method of providing a sequence set for an RACH or a ranging channel according to one embodiment of the present invention, information on a cause for accessing an RACH or a ranging channel, random ID, CQI and the like is decided as a type of information to be represented via a corresponding sequence. And, a sequence set is provided in a manner that an allocation degree of a sequence number according to each of the information is differently specified according to a location of a user equipment within a cell in the course of deciding allocation information on the sequence number according to each corresponding information.

Of course, a sequence number is allocated by considering a cause for a user equipment to access an RACH or a ranging channel as well as a location of the user equipment within a cell, as mentioned in the foregoing description. Hence, it is more efficient to lower collision probability in an RACH or a ranging channel.

In the above-explained embodiment, a location of a user equipment within a cell may mean a distance from a base station itself. Preferably, preset information, which indicates that a user equipment belongs to which region within a cell, is represented within reference to the distance from the base station.

For instance, if a user equipment is remote from a base station over a predetermined distance, the user equipment decides that it is located at a cell edge. If a user equipment is remote from a base station below a predetermined distance, the user equipment decides that it is located at a cell center. Thus, a distance, which becomes a reference to discriminate a region within a cell, may be equal to or greater than 1. An extent of each reference distance can be decided by depending on various factors including an antenna height of a base station, a transmission power, and the like, which brings signal attenuation, roundtrip delay time, and the like.

Figure 14:
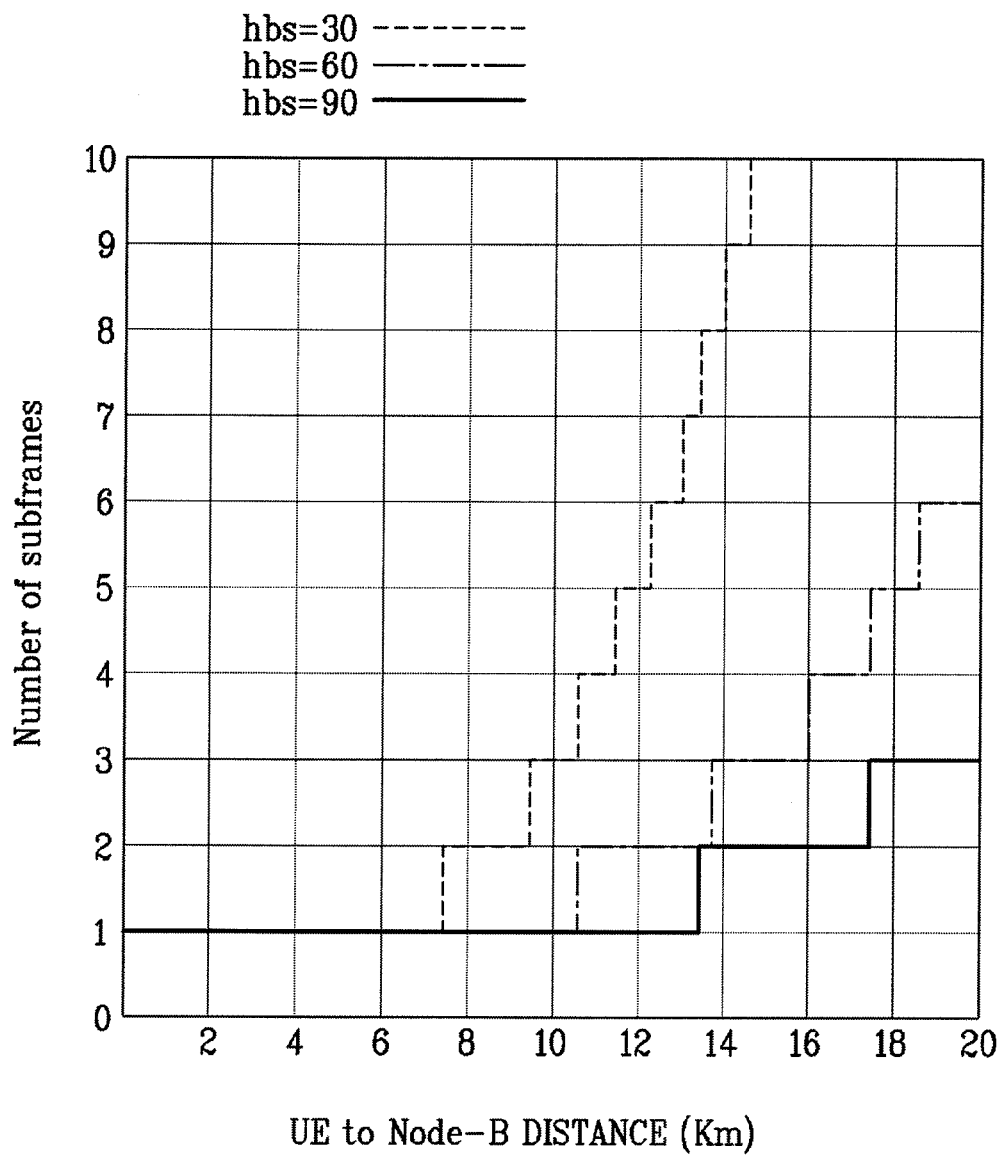
FIG. 14 is a graph for an increasing transition of an RACH or ranging channel length requested in correspondence to an increasing distance between a user equipment and a base station in proportion to an antenna length of the base station.

FIG. 14 is a graph for an increasing transition of an RACH or ranging channel length requested in correspondence to an increasing distance between a user equipment and a base station in proportion to an antenna length of the base station.

In FIG. 14, a horizontal axis indicates a distance between a UE from a node B (or a base station) by a unit of km and a vertical axis indicates a number of subframes occupied by an RACH or a ranging channel according to the distance. In FIG. 14, it is assumed that the subframe has a length of 0.5 ms as currently provided by 3GPP LTE.

Referring to FIG. 14, in case that an antenna length of a base station (height of base station: hbs) is 90 m, compared to a case that the hbs is 60 m or 30 m, an increment of the number of the subframes necessary for the distance increasing from the base station is small. Yet, in case that the hbs is 30 m, the number of the necessary subframes is rapidly incremented according to the distance.

Hence, according to one embodiment of the present invention, the distance from the base station, which is used to discriminate a region within a cell is decided by considering the antenna height of the base station.

For instance, in case that the inner cell region discrimination is carried out by dividing a cell into three regions R1, R2 and R3, as shown in FIG. 5, distances (e.g., D1 and D2) corresponding to references for this discrimination in case of the hbs 90 m can be set greater than those in case of the hbs 30 m. And, various factors including a transmission power and the like as well as the aforesaid antenna height of the base station (hbs) can be taken into consideration for the region discrimination.

In the example shown in FIG. 13, the region discrimination according to a location of a user equipment within a cell is carried out into two regions. And, causes for a user equipment to access an RACH or a ranging channel include four kinds of handoff, power-on, resource request and synchronization for example. So, eight kinds of sequence sets are provided. Yet, the sequence set provision is just exemplary. And, it is apparent to those skilled in the art that sequences can be allocated and provided with arbitrary combinations of the causes if collision probability is reduced by providing sequences differing from each other according to a cause for a user equipment to access an RACH or a ranging channel and a location of a user equipment within a cell.

In the above-explained embodiment of the present invention, it is assumed that all the UEs know path loss and roundtrip delay values in accordance with a distance from the base station to some extent. Yet, a UE may have difficulty in deciding the distance from the base station by itself.

If so, rather than providing a different RACH or ranging channel in accordance with the distance between the base station and the UE, it is able to apply a method of selecting a suitable RACH or ranging channel requisite in accordance of measurement performed by the UE itself in a manner of providing an RACH or a ranging channel differing in an arbitrary means for enabling the UE to judge a requisite requested in accordance with a location of the UE within the cell, i.e., an attenuation extent of a downlink signal (e.g., downlink CQ information to each UE, etc.).

Moreover, a UE speed and the like, as explained for the first embodiment, as well as the downlink signal attenuation extent can be taken into consideration as the RACH or ranging channel requisite differently requested by each UE.

Hence, one preferred embodiment of the present invention proposes a method of considering a speed of UE in addition in judging the different requisite for the RACH or the ranging channel per UE. In particular, a corresponding UE obtains information about its location within a cell in accordance with a downlink signal attenuation extent, selects an RACH or ranging channel structure and/or sequence suitable for the information about its location within the cell and/or its speed, and then transmits a signal using the selected structure and/or sequence.

Explained in the following is a method of transmitting a signal in a manner that a user equipment accesses an RACH or a ranging channel using a combination of sequences or a sequence set differently provided in accordance with a location of the user equipment within a cell and the like.

Figure 15:
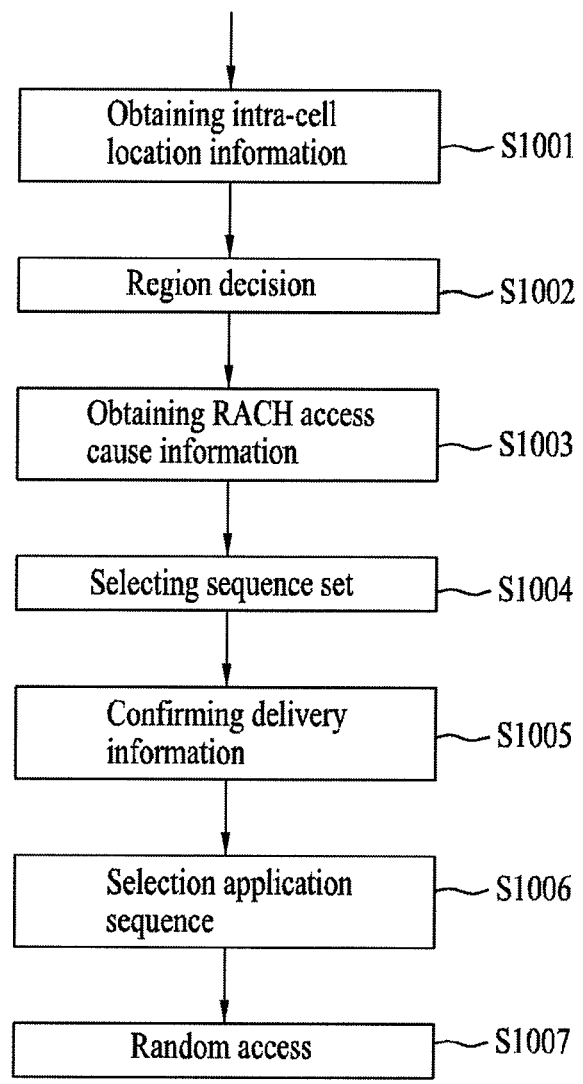
FIG. 15 is a flowchart to explain a signal transmitting method according to one embodiment of the present invention.

FIG. 15 is a flowchart to explain a signal transmitting method according to one embodiment of the present invention.

In a signal transmitting method of a user equipment according to one embodiment of the present invention, a user equipment selects a sequence set in accordance with its location within a cell and then accesses an RACH or a ranging channel by selecting a sequence from the selected sequence set. For this, information indicating a prescribed location of the corresponding user equipment within the cell needs to be obtained by a step S1001 shown in FIG. 15. The information on the location within the cell can be acquired from attenuation of a downlink signal from a base station. And, a acquisition of the information on the location within the cell is disclosed in detail in the aforesaid Korean Patent Application No. 2006-74764.

The aforesaid Korean Patent Application No. 2006-74764 teaches that a user equipment is able to measure a distance from a base station via an extent of attenuation of a downlink signal from the base station. Yet, if the measurement is not available, the user equipment is able to acquire location information in a manner of transmitting an initiation access signal on the assumption of a distance that is farthest from the base station and then receiving a signal from the base station in response to the initiation access signal. Yet, location information of a user equipment within a cell can be obtained in advance prior to accessing a corresponding RACH or a ranging channel. And, it is unnecessary to go though the step S1001 each time for a signal transmission of the user equipment via an RACH or a ranging channel.

In case that the information indicating the location of the user equipment within the cell is acquired, the user equipment is able to decide a region to which the user equipment itself belongs in a step S1002 using the acquired information. Such a region decision can be carried out in a manner of deciding to be located at a cell edge if the user equipment is spaced apart from the base station over a specific distance or at a cell center if the user equipment is spaced apart from the base station within a specific distance. Yet, the cell can be divided into three regions instead of two. If so, regions are discriminated from each other according to two kinds of specific distances from the base station. As mentioned in the foregoing description, this region discrimination can be decided according to various factors including an antenna length of a base station, a transmission power, and the like.

Once the location information of the user equipment within the cell is obtained and the corresponding region decision is completed, such a step as a step S1003 can be carried out to obtain information on a cause for accessing an RACH or a ranging channel.

To a sequence set for an RACH or a ranging channel according to one embodiment of the present invention, a different sequence number is allocated in accordance with a location of the user equipment within the cell only. Instead, it may be more preferable that a different sequence number, as shown in FIG. 13, is allocated in accordance with RACH or ranging channel access cause information as well as the location information.

After the location information within the cell and the ranging channel access cause information have been obtained, the user equipment is able to select a corresponding sequence set in a step S1004. For instance, in the example shown in FIG. 13, if the user equipment is decided to be located at the cell edge because the location of the user equipment is beyond the prescribed distance and if a cause for the user equipment to access the RACH or the ranging channel is handoff, a sequence set having N1E sequences allocated thereto is selected.

After the sequence set has been selected, the user equipment checks additional information to deliver to the base station in a step S1005. For instance, in case of transmitting CQI information indicating a downlink channel quality, a sequence suitable for indicating a corresponding CQI is selected from the sequence set.

Having selected a sequence having a randomly selected random ID from the corresponding sequence set in a step S1006, the user equipment accesses an RAH or a ranging channel through the selected sequence (step S1007).

In the above description, a signal transmitting method of a user equipment via an RACH or a ranging channel according to one embodiment of the present invention has been explained. And, it is apparent to those skilled in the art that an RACH or a ranging channel can be accessed by a scheme different from the sequence set selecting step and the step of selecting the suitable sequence from the corresponding sequence set if the RACH or the ranging channel is accessed using a sequence differently allocated in accordance with a location of a user equipment within a cell and a cause for the user equipment to access the RACH or the ranging channel. So, no limitation is put on the above embodiment.

For clarity and convenience of explanation, a terminology 'sequence set' is used to describe each set having a different number of sequences allocated thereto in accordance with a location of a user equipment within a cell in the following description.

Figure 16:
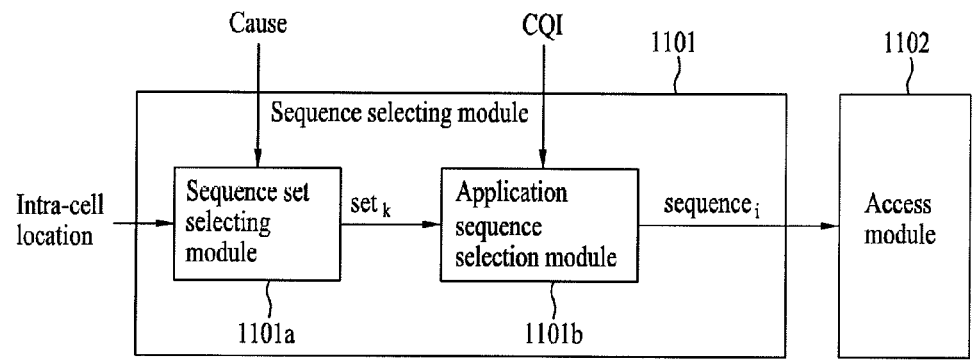
FIG. 16 is a diagram of a signal transmitting device according to one embodiment of the present invention.

FIG. 16 is a diagram of a signal transmitting device according to one embodiment of the present invention.

Referring to FIG. 16, a signal transmitting device according to one embodiment of the present invention includes a sequence selecting module 1101 and an access module 1102.

The sequence selecting module 1101 selects a sequence in accordance with information to be delivered to a base station. And, the sequence selecting module 1101 can include a sequence set selecting module 1101a and an application sequence selecting module 1101b in accordance with its function.

The sequence set selecting module 1101a obtains a location of a user equipment within a cell and then selects a corresponding sequence set $set_k$ through intra-cell inclusive region information decided according to the obtained location. Optionally, a mentioned in the foregoing description, if a sequence set is selected by considering a case for a user equipment to access an RACH or a ranging channel as well the intra-cell location information, it is able to more efficiently reduce collocation probability in the RACH or the ranging channel.

The selected sequence set $set_k$ is inputted to the application sequence selecting module 1101b. The application sequence selecting module 110b then selects a suitable sequence $sequence_i$ by considering other informations including CQI to be delivered to a base station via the RACH or the ranging channel.

In case that a sequence to be applied to the RACH or the ranging channel is selected, the access module 1102 accesses the RACH or the ranging channel through the sequence $sequence_i$. Through this, the signal transmitting device according to one embodiment of the present invention can reduce the collision probability in the RACH or the ranging channel.

Thus, according to a second embodiment of the present invention, collision probability in an RACH or a ranging channel can be reduced in a manner of allocating a sequence set differently based on an intra-cell location of each UE and preferably a cause for a user equipment to access an RACH or a ranging channel and then using the allocated sequence set.

Meanwhile, explained in the following description is a signal receiving method using a different delay time in accordance with an intra-cell location of a UE (i.e., the segmented access scheme in a broad meaning), which is to facilitate a receiving side to perform a sequence detection in an RACH or a ranging channel if factors for a sequence get complicated, according to a third embodiment of the present invention.

Third Embodiment

To meet the different factor in accordance with an intra-cell location of a UE, as mentioned in the foregoing description of FIG. 5, if a different sequence is used in accordance with the intra-cell location of the UE, more burden is imposed on a base station that searches for a sequence used for an RACH or a ranging channel.

In case that all information delivered to a base station is carried by a sequence applied to an RACH or a ranging channel, sequence types used for the RACH or the ranging channel are more diversified. Yet, this may be accompanied with a reduction of a number of available sequences.

Hence, a third embodiment of the present invention intends to provide a method of representing information to be delivered to a base station using another scheme except a sequence type and reducing a burden imposed on a base station in searching for a sequence used for an RACH or a ranging channel.

A third embodiment of the present invention intends to propose an efficient sequence searching method and an efficient signal receiving method by paying attention to a fact that a signal carried on an RACH or a ranging channel is delivered with delay information differing in accordance with a location of a UE among the conditions differently requested in accordance with an intra-cell location of the UE in the description of FIG. 5.

In particular, a signal is transmitted at a timing point distant by a roundtrip delay corresponding to a location of a UE from a reference timing corresponding to a downlink signal transmitting timing point. So, if a cell size is increased, a section having a signal spread therein is elongated. Such delay information facilitates a sequence detection performed by a receiving end and provides a UE with an additional RACH or ranging channel access opportunity.

In a related art, a delay time for a signal detected within an RACH or a ranging channel is used as information for a timing detection for a UE only. Yet, there exists a scheme for enabling the information to carry more additional information. Namely, if a signal delay is interpreted in a different way, it is advantageous to obtain better features.

This is considered in all aspects with reference to FIG. 17 as follows.

Figure 17:
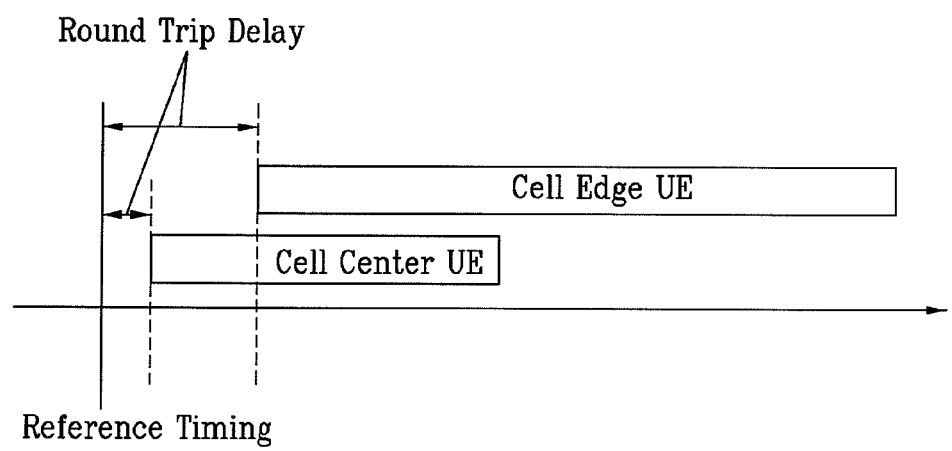
FIG. 17 is a diagram for a round-trip delay time of an RACH or ranging channel signal received by a base station.

FIG. 17 is a diagram for a roundtrip delay time of an RACH or ranging channel signal received by a base station.

Referring to FIG. 17, if a timing point of transmitting a downlink signal from a base station is set to a reference timing point, an RACH or ranging channel signal transmitted by a cell center UE in response to the downlink signal from the base station has a short roundtrip delay time, whereas an RACH or ranging channel signal transmitted by a cell edge UE in response to the downlink signal from the base station has a relatively long roundtrip delay time. So, a signal in a receiving end seems to be discriminated by a delay time in each of the cell edge UE and the cell center UE. Thus, a roundtrip delay difference in accordance with a region to which a prescribed location of a UE belongs among a plurality of regions within a cell is generally increased to correspond to an increasing cell size.

Hence, one embodiment of the present invention proposes a method of reducing a search time in a manner of differently setting a sequence set (a set variation of a reference set (e.g., PN, CAZAC, etc.), a cyclic shift set variation, a cyclic shift interval variation, etc.) that should be searched with the delay time by the receiving end in detecting an RACH or ranging channel signal. In this case, the delay time means a roundtrip delay time until a base station receives an RACH or ranging channel signal from a corresponding UE in response to a downlink signal from the base station if a downlink transmission timing point of the base station is set to a reference timing point. And, the delay time increases in proportion to a distance between the UE and the base station.

As taught by the aforesaid patent application and the first and second embodiments of the present invention, if a sequence to be used in accordance with a region to which an intra-cell location of a UE belongs is set, it is possible to perform a search by taking a sequence set, which is assigned to be used for a corresponding region with reference to an arriving timing point of an RACH or ranging channel signal, as shown in FIG. 17, and more particularly, to a start timing point of a sequence used for an RACH or a ranging channel as a search target sequence only. This scheme is explained with reference to FIG. 18 for example as follows.

Figure 18:
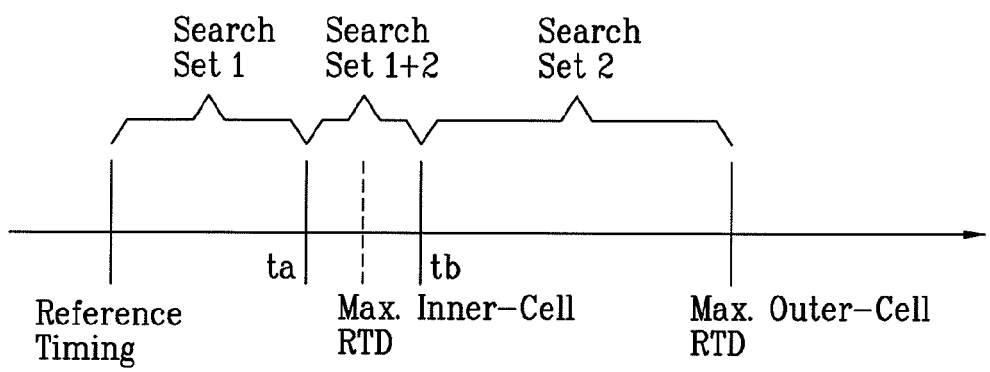
FIG. 18 is a diagram to explain a method of changing a sequence set searched in correspondence to a delay time of an RACH or ranging channel signal received by a base station according to one embodiment of the present invention.

FIG. 18 is a diagram to explain a method of changing a sequence set searched in correspondence to a delay time of an RACH or ranging channel signal received by a base station according to one embodiment of the present invention.

FIG. 18 shows a sequence searching scheme according to one embodiment of the present invention by taking a case of discriminating a cell into two regions, a cell center and a cell edge as an example.

If a delay time is smaller than a prescribed threshold ta at a reference time position, it is the delay time a transmission signal of a cell center UE can have only. It is unnecessary to search for a sequence used by a cell edge UE.

If a delay time is greater than another prescribed threshold tb, a transmission signal of a cell center UE is unable to have the delay time. So, sequences used by cell edge UEs are searched only.

In FIG. 18, assuming that a sequence used by the cell center UE is named a sequence set 1 and a sequence used by the cell edge UE is named a sequence set 2, if the delay time is equal to smaller than ta, the sequence set 1 is searched as a search target sequence set. If the delay time is equal to or greater than tb, the sequence set 2 is searched as a search target sequence set.

Yet, if a UE approaches a boundary between the cell center and the cell edge, unless the UE is able to accurately recognize its location, a location of the UE may be irregularly determined between the cell center and the cell edge. So, sequences of both regions will be mixed and used. So, if a delay time of a received signal is in the vicinity of a maximum roundtrip delay time of a UE within a cell, i.e., in the region except a region (region below ta) a signal of an intra-cell UE can have only and a region (region above tb) a signal of a cell edge UE can have only (ta≦RTD≦tb), it is preferable that the entire sequence sets are searched. Yet, since a number of sequences searched for each delay time can be reduced overall, the base station is able to considerably reduce complexity of calculations.

As mentioned in the above description, using the sequence search method shown in FIG. 18, there is another advantage as well as the complexity of calculations is reduced. For instance, there is no problem in using different zero correlation zones for sequences used in the cell center and the cell edge, respectively.

Generally, a representative sequence used for an RACH or a ranging channel is a CAZAC sequence. And, a number of available CAZAC sequences amounts to a multiplication of a number of mother sequences according to ID of CAZAC sequence and a number of ZCZ transformable by applying a cyclic shift to the CAZAC sequence. Preferably, ZCZ has an interval enough for a receiving end to discriminate the ZCZ even if a cyclic shift is applied within CAZAC sequence. Since vagueness of a cyclic shift applied to a sequence by a receiving end can be generated due to delay spreading and the like, a sequence having a short ZCZ length is preferably applied in case of a cell center UE having small delay spreading and the like. In case of a cell edge UE, it is preferable that a sequence having a long ZCZ length is used.

Based on this, a transmission signal of a cell center UE and a transmission signal of a cell edge UE, as shown in FIG. 18, are discriminated from each other in accordance with a delay time of a received RACH or ranging channel signal and each corresponding sequence set is searched only. So, even if ZCZ uses a different sequence, vagueness of discrimination is reduced.

In particular, if a mother sequence used for a search target sequence set 2 and a mother sequence used for a search target sequence set 1 are set different from each other, a base station performs a detection with a received delay time even if the mother sequences have ZCZs differing from each other in interval. So, it is more preferable that vagueness is not generated in detecting ZCZs having different intervals from different mother sequences, respectively.

The above-explained scheme corresponds to a physical delay phenomenon generated in accordance with a distance between a UE and a base station.

Yet, another embodiment of the present invention proposes a scheme for attaching an intentional delay time thereto. In this case, the intentional delay means a scheme for inserting an additional delay to discriminate a signal transmitting timing point from a physical delay time in accordance with information to be transmitted to a base station. Such a scheme is explained with reference to FIG. 19 as follows.

Figure 19:
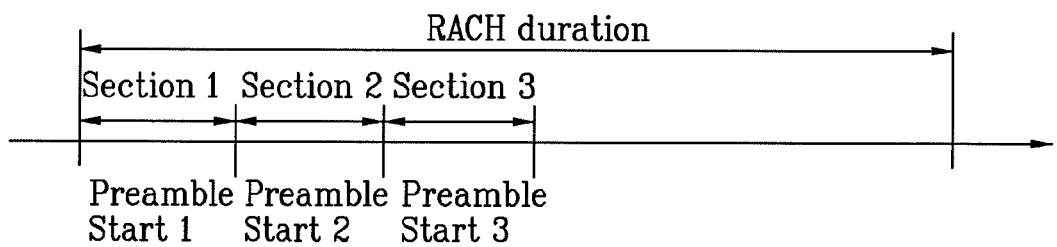
FIG. 19 is a diagram to explain a method of inserting intentional delay information in a transmission signal by a UE according to one embodiment of the present invention.

FIG. 19 is a diagram to explain a method of inserting intentional delay information in a transmission signal by a UE according to one embodiment of the present invention.

In case that a physical delay time in a given cell size is (roundtrip delay time+delay spreading), FIG. 19 proposes a scheme that an intentional delay time corresponding to a size of each section (Section 1, Section 2, . . . ) divided on a time axis in FIG. 19 defines an additional region, as shown in FIG. 19, using a size of the aforesaid delay time as a basic unit. And, it is not mandatory to limit a unit of an intentional delay to a size of a physical delay time. Actually, it can be greater or smaller than the physical delay time. Yet, it may be preferable that a time section for an intentional delay is set to a unit of a physical delay of a whole region UE within a cell in that a base station as a receiving end does not confuse a physical delay time of an RACH or ranging channel signal transmitted by a UE in each region with a quantity of an intentional time delay for delivering corresponding information.

In case that an intentional delay, as shown in FIG. 19, is inserted, a transmission start area of each preamble becomes an RACH or ranging channel preamble transmission position provided in advance to coincide with information defined in the corresponding position.

Namely, in case that each time section shown in FIG. 19 is interpreted as CQ information, a UE calculates downlink CQ information and then transmits an RACH or a ranging channel signal at a corresponding preamble transmission start position. If so, an additional sequence is unnecessary to transmit CQI. So, overall sequence reuse increases. Information transmittable with reference to a delayed position includes CQ information, RACH or ranging channel access cause information, random ID information, or the like.

Meanwhile, in case that each section (Section 1, Section 2, . . . ) divided on a time axis uses a sequence of a same mother index, it may happen that different ZCZ sequences having the same mother sequence transmitted from different sections are not discriminated from each other due to a delay.

Hence, according to one embodiment of the present invention, since an RACH or ranging channel preamble transmitted from a start position of each section in delivering an RACH or ranging channel signal should be a discriminative sequence, it is able use a ZCZ sequence set of which different mother sequences are used by the sections, respectively.

According to one embodiment of the present invention, the sequence searching method shown in FIG. 18 is executable as soon as information is delivered by the scheme shown in FIG. 19.

Figure 20:
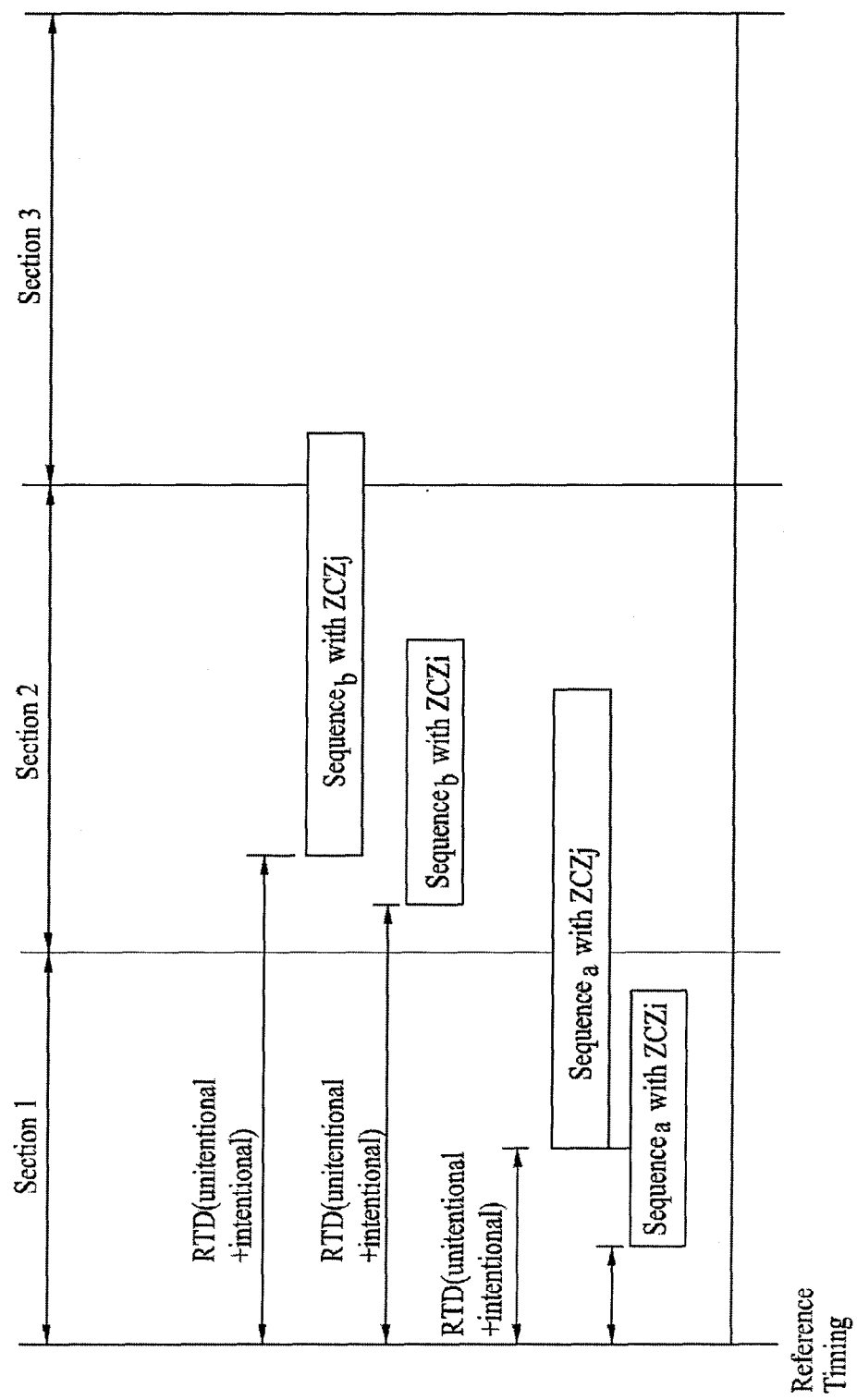
FIG. 20 is a diagram to explain a method of interpreting information based on a delay time, which is attributed to a location of a UE having transmitted an RACH or ranging channel signal received by a base station, and intentional delay time according to one embodiment of the present invention.

FIG. 20 is a diagram to explain a method of interpreting information based on a delay time, which is attributed to a location of a UE having transmitted an RACH or ranging channel signal received by a base station, and intentional delay time according to one embodiment of the present invention.

FIG. 20 shows a case that a time section for an intentional delay is set equal to or greater than a maximum roundtrip delay time, which is physically possible, to discriminate a physical delay time.

In particular, an RACH or ranging channel signal from a UE in a region located at a cell edge selecting a transmission timing point as a section 1 according to information to be delivered is set to arrive at a base station faster than an RACH or ranging channel signal of a UE in a region at a cell center selecting a transmission timing point as a section 2. In case that a time section for an intentional delay is set to a first time section and a time section according to a physical delay time is set to a second time section, it is assumed that the first time section is wider than the second time section and that a section according to all the second time sections is included each section on a time axis having the first time section.

Hence, it is able to prevent a location of a UE having transmitted a corresponding RACH or ranging channel signal from being confused due to an intentional delay according to information to be delivered.

A base station is able to select a search target sequence set according to a delay time of a received signal in each section shown in FIG. 20. For instance, search is carried out in a manner of setting a sequence set having $ZCZ_i$ of a mother sequence called a sequence a until a prescribed time in a section 1 shown in FIG. 20 and then using a sequence set having $ZCZ_j$ of the same mother sequence as a search target sequence after the corresponding time.

Hence, as a number of search target sequences is decremented, calculation complexity in the base station can be reduced.

Meanwhile, the UE selects a section for transmitting an RACH or ranging channel signal with an intentional delay according to information to be delivered to the base station and then transmits the signal. The base station then interprets the delivered information according to which section corresponds to a start timing point of the sequence used for the received RACH or ranging channel signal.

In this case, if each section uses a different mother sequence, it is preferable to reduce vagueness of discrimination. And, FIG. 20 shows that a sequence b as a different mother sequence is used for the section 2 unlike the section 1. Of course, if a search target sequence set is selected within the section 2 using a physical delay time, it is able to facilitate the base station to perform a sequence search.

To carry out the above-explained sequence searching and signal transmitting/receiving methods, the following device configuration is preferably used. A sequence searching device and a signal transmitting device are explained as follows.

Figure 21:
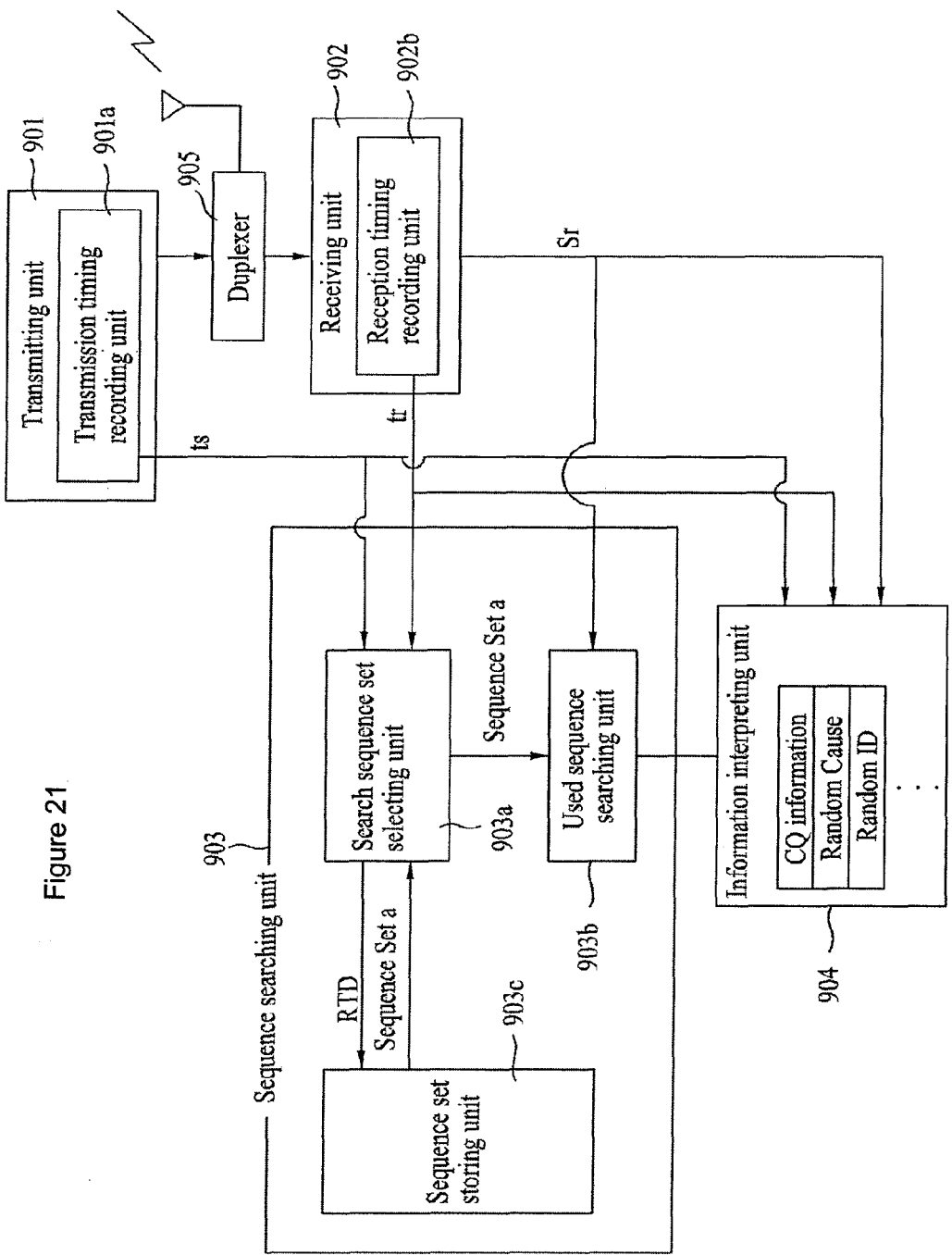
FIG. 21 is a block diagram of a sequence searching device for searching a sequence used for a received RACH or ranging channel signal and a signal transmitting device of a base station for interpreting received information as soon as the sequence is searched according to one embodiment of the present invention.

FIG. 21 is a block diagram of a sequence searching device for searching a sequence used for a received RACH or ranging channel signal and a signal transmitting device of a base station for interpreting received information as soon as the sequence is searched according to one embodiment of the present invention.

Referring to FIG. 21, a signal transmitting device according to one embodiment of the present invention includes a transmitting unit 901, a receiving unit 902, and a sequence searching unit 903.

The sequence searching unit 903 shown in FIG. 21 is cable of playing a role as an independent sequence searching device. And, the sequence searching unit 903 can include a search sequence set selecting unit 903a, a used sequence searching unit 903b, and a sequence set storing unit 903c.

A signal transmitting device according to another embodiment of the present invention can further include an information interpreting unit 904 as well as the above-explained elements.

The above device configuration is included in a base station. And, the base station can include a transmitting unit 901 and a duplexer 905 enabling an antenna to be shared by the transmitting unit 901 and the receiving unit 902.

Details of the above elements are explained in the following description.

According to one embodiment of the present invention, the base station is able to transmit a downlink signal via the transmitting unit 901. And, the transmitting unit 901 can include a transmission timing point recording unit 901a recording a timing point ts of transmitting the downlink signal.

Such a transmission signal is transmitted in downlink via the duplexer 905. If a UE transmits an RACH or ranging channel signal in response to the transmission signal, the base station receives the RACH or the ranging channel signal via the duplexer 905 using the receiving unit 902.

And, the receiving unit 902 can have a reception timing point recording unit 902b recording a timing point tr of receiving the RACH or the ranging channel signal like the transmitting unit 901.

Informations ts and tr for the timing points of the transmission and reception timing point recording units 901a and 902a are inputted to the search sequence set selecting unit 903a.

The search sequence selecting unit 903a calculates a roundtrip delay time RTD via a delay time corresponding to a difference between the transmission timing point ts and the reception timing point tr and then selects a search target sequence set (sequence set$_a$) from stored sequence sets stored in the sequence set storing unit 903c through the calculated roundtrip delay time RTD. Information on the selected search target sequence set (sequence set$_a$) is then delivered to the used sequence searching unit 903b.

The used sequence searching unit 903b searches that a sequence used for the RACH or ranging channel signal received by the receiving unit 902 belongs to which sequence of the search target sequence set (sequence set$_a$). This search can be executed by a correlation operation between the RACH or ranging channel signal and each of search target sequences or decided by another arbitrary operation.

Thus, in case that the used sequence searching unit 903b checks which sequence is used for the received RACH or ranging channel signal, synchronization is estimated using the corresponding sequence. If there exists information inserted in the corresponding sequence, it can be obtained.

According to another embodiment of the present invention, an information interpreting unit 904 can be included to interpret information delivered to the base station through an extent of a delay confirmed through the timing point information of the transmitting unit 901 and the receiving unit 902, and more particularly, through an extent of the intentional delay explained with reference to FIG. 19 and FIG. 20.

The information interpreting unit 904 is able to receive transmission timing point information is from the reception timing point recording unit 901a of the transmitting unit and reception timing point information tr from the reception timing point recording unit 902a of the receiving unit 902.

Through this, the information interpreting unit 904 is able to calculate a roundtrip delay time of a received signal. In the present embodiment, the roundtrip delay time includes an intentional delay time for information delivery as well as a physical delay attributed to an intra-cell location of the UE having transmitted the corresponding signal.

Information obtained by the information interpreting unit 904 through the roundtrip delay time information includes CQ information, random access cause information, random ID information, and the like, as shown in FIG. 21. And, every random information deliverable to the base station via an uplink signal can be included in the corresponding information.

Configurational features of a signal transmitting device of a UE according to one embodiment of the present invention are explained as follows.

Figure 22:
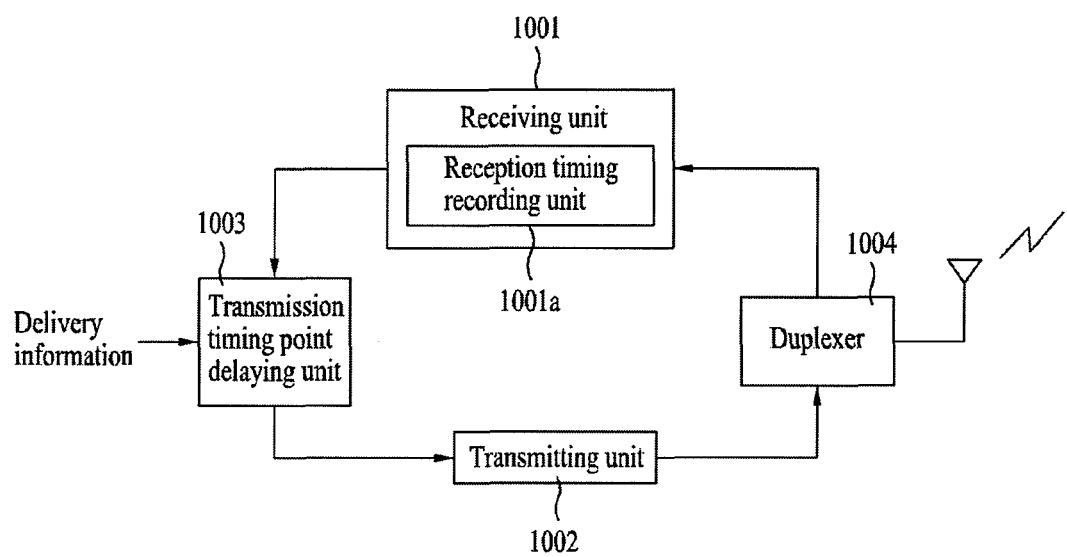
FIG. 22 is a block diagram of a signal transmitting device of a UE for transmitting a signal in a manner of inserting intentional delay information in an RACH or ranging channel signal according to one embodiment of the present invention.

FIG. 22 is a block diagram of a signal transmitting device of a UE for transmitting a signal in a manner of inserting intentional delay information in an RACH or ranging channel signal according to one embodiment of the present invention.

Referring to FIG. 22, a signal transmitting device according to one embodiment of the present invention includes a receiving unit 1001, a transmitting unit 1002, and a transmission timing point delaying unit 1003.

The signal transmitting device is preferably included in a UE and can include a duplexer 1004 for enabling an antenna to be shared by both of the receiving and transmitting units 1001 and 1002. The respective elements are explained in more detail as follows.

First of all, the receiving unit 1001 receives a downlink signal transmitted by a base station and then records a corresponding reception timing point. Such a reception timing point recording, as shown in FIG. 22, can be performed by a separate reception timing point recording unit 1001a.

The UE having received the downlink signal is able to transmit a necessary RACH or ranging channel signal if a random access to the base station is needed. And, such an RACH or ranging channel signal can be transmitted via the transmitting unit 1002.

Yet, according to one embodiment of the present invention, a transmission timing point delaying unit 1003 can be further included to intentionally delay a transmission timing point according to information to be delivered to the base station in a downlink signal reception and an RACH or ranging channel signal transmission in response thereto. Through this, the base station receiving an RACH or ranging channel signal transmitted via the transmitting unit 1002 is able to obtain corresponding information according to an extent of an intentional delay.

Of course, as mentioned in the foregoing description with reference to FIG. 19 and FIG. 20, a time intentionally delayed by the transmission timing point delaying unit 1002 is equal to greater than a quantity resulting from adding a physical delay according to an intra-cell location of a UE, i.e., a roundtrip delay time and a delay spreading together, which is preferable for the base station to discriminate a sequence.

The aspect in adjusting a setup for an RACH or a ranging channel based on intra-call location of UE is common to the first to third embodiments of the present invention.

The first embodiment of the present invention intensively deals with an RACH or ranging channel configuration itself according to RACH or ranging channel requisites differing from each other per UE.

The second embodiment of the present invention intensively deals with the aspect in transmitting an RACH or ranging channel.

And, the third embodiment of the present invention intensively deals with the aspect in receiving an RACH or ranging channel.

Moreover, the schemes according to the respective embodiments of the present invention can be appropriately combined together to be used by both of the transmitting and receiving sides.

For instance, in case that an RACH or a ranging channel is accessed using a sequence set differently allocated according to an intra-cell location of a UE and/or a cause for a UE to access the RACH or the ranging channel, a transmission timing point of the RACH or the ranging channel for an additional information transmission can be adjusted by the third embodiment to be transmitted.

And, a sequence set differently allocated according to an intra-cell location of each UE and/or a cause for a UE to access the RACH or the ranging channel according to the second embodiment can be a sequence set to be applied to an RACH or a ranging channel configured to meet a different RACH or ranging channel requisite per UE according to the first embodiment. Namely, if a sequence set is established according to the second embodiment, a peed of UE and the like can be additionally taken into consideration by considering such a condition as a frequency offset and the like according to the first embodiment.

Moreover, when a receiving side searches sequences by considering a delay time of an RACH or a ranging channel according to the third embodiment, a sequence set considered in accordance with each delay time can be a sequence set differently allocated in accordance with an intra-cell location of a UE and/or a cause for a UE to access an RACH or a ranging channel according to the second embodiment. This can be transmitted via an RACH or ranging channel structure established according to the first embodiment.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a signal transmitting/receiving method and apparatus and a sequence allocating method for the same according to the respective embodiments of the present invention are applicable to 3GPP LTE system.

Yet, a basic configuration of a scheme of allocating a sequence by considering different requisites in accordance with an intra-cell location of a UE and then detecting a corresponding sequence is applicable to every random mobile communication system to which a different requisite is requested in accordance with an intra-cell location of a UE, a terminal, a mobile device or the like as well as to the 3GPP LTE system.

What is claimed is:

1. A method for transmitting a signal via a random access channel by a specific user equipment (UE), the method comprising:
   selecting, by the specific UE, one random access preamble sequence set from among plural predetermined random access preamble sequence sets by considering a size of information to be transmitted by the specific UE and a degree of a path loss,
   wherein sequences within the predetermined random access preamble sequence sets are generated by applying a cyclic shift to a CAZAC (Constant Amplitude Zero Auto Correlation) sequence, and wherein a first number of the sequences and a second number of the sequences are allocated to each of a first and a second random access preamble sequence set within the predetermined random access preamble sequence sets;

randomly selecting, by the specific UE, a specific sequence within the selected one random access preamble sequence set; and transmitting, by the specific UE, the selected specific sequence via the random access channel.

2. The method of claim 1, wherein the first number and the second number are differently determined.

3. The method of claim 1, wherein the sequences within the predetermined random access preamble sequence sets comprise a sequence having a repeated preamble structure.

4. The method of claim 1, wherein the path loss is a path loss of a downlink signal.

5. The method of claim 1, further comprising:

determining the degree of the path loss in accordance with an intra-cell location of the specific user equipment.

6. An apparatus for transmitting a signal, the apparatus comprising:

a sequence selecting module configured to acquire information about plural random access preamble sequence sets, select one random access preamble sequence set from among the plural random access preamble sequence sets by considering a size of information to be transmitted by the apparatus and a degree of a path loss, wherein sequences within the predetermined random access preamble sequence sets are generated by applying a cyclic shift to a CAZAC (Constant Amplitude Zero Auto Correlation) sequence, and wherein a first number of the sequences and a second number of the sequences are allocated to each of a first and a second random access preamble sequence set within the predetermined random access preamble sequence sets within the number of available CAZAC sequences, and randomly select a specific sequence within the selected one random access preamble sequence set; and an access module configured to access a random access channel using the specific sequence selected by the sequence selecting module.

7. The apparatus of claim 6, wherein the first number and the second number are differently determined.

8. The apparatus of claim 6, wherein the sequences within the predetermined random access preamble sequence sets comprise a sequence having a repeated preamble structure.

9. The apparatus of claim 6, wherein the path loss is a path loss of a downlink signal.

10. The apparatus of claim 6, wherein the degree of the path loss is determined in accordance with an intra-cell location of the specific user equipment.

* * * * *